May 31, 1949.　　　　G. BRINKMANN　　　　2,471,406
GRINDING MACHINE

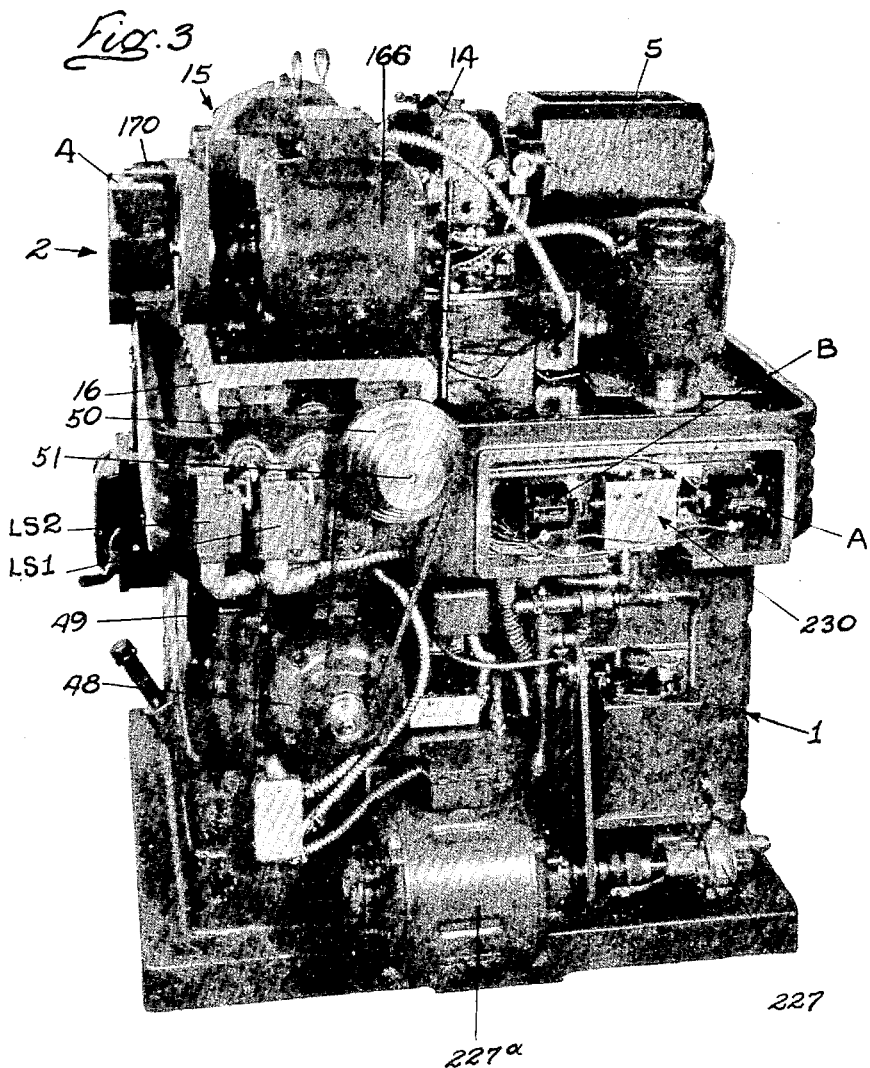

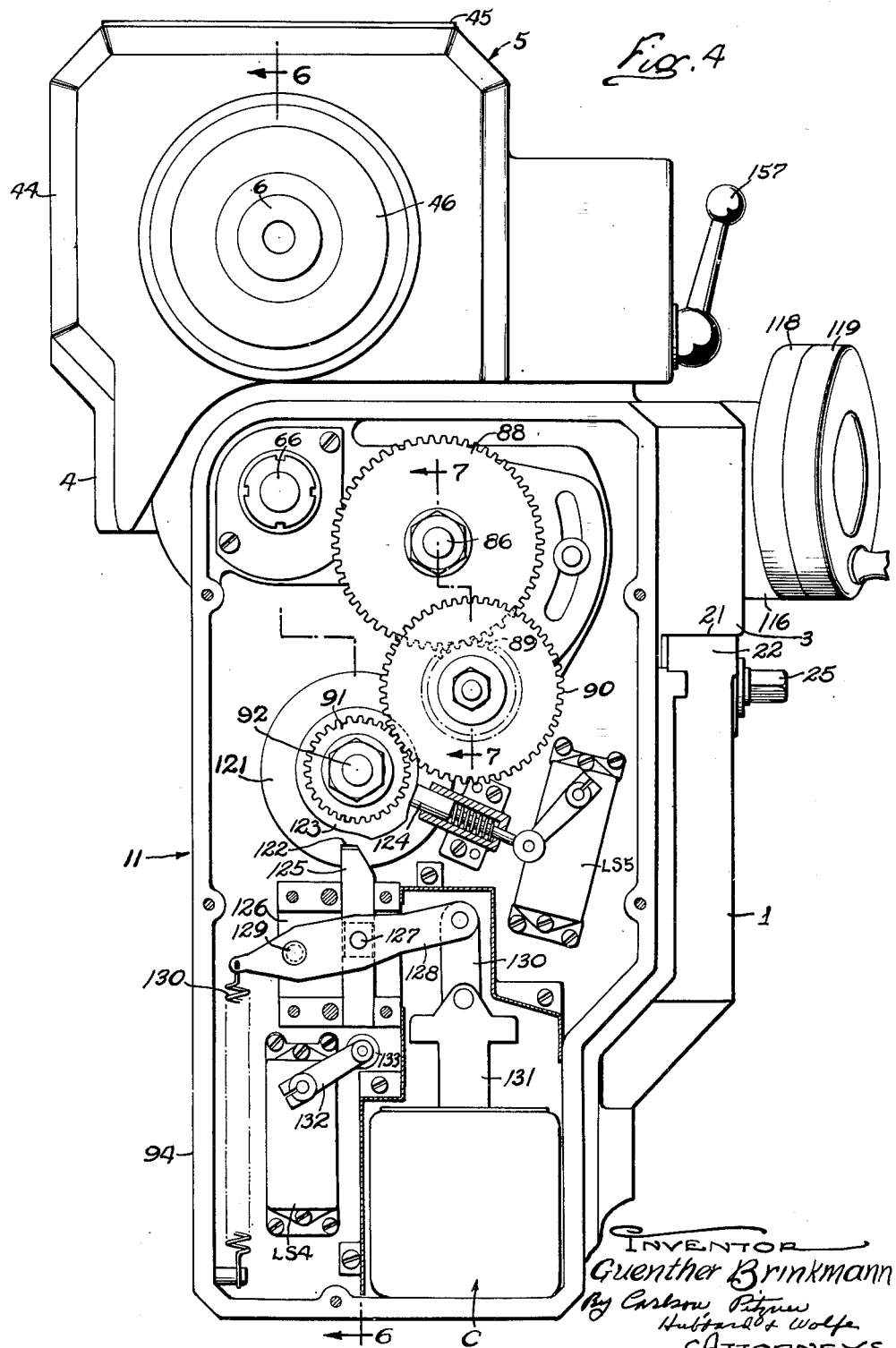

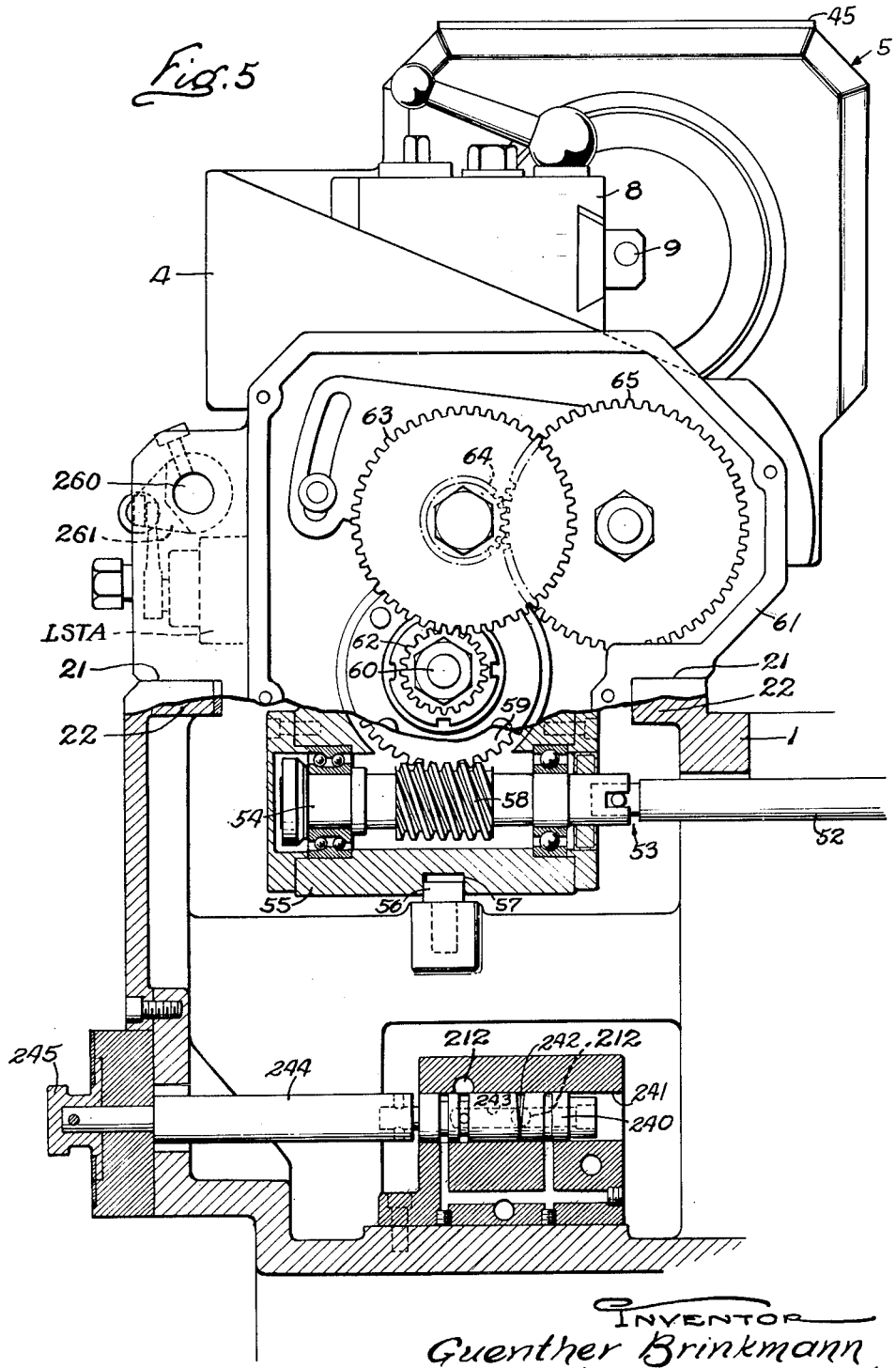

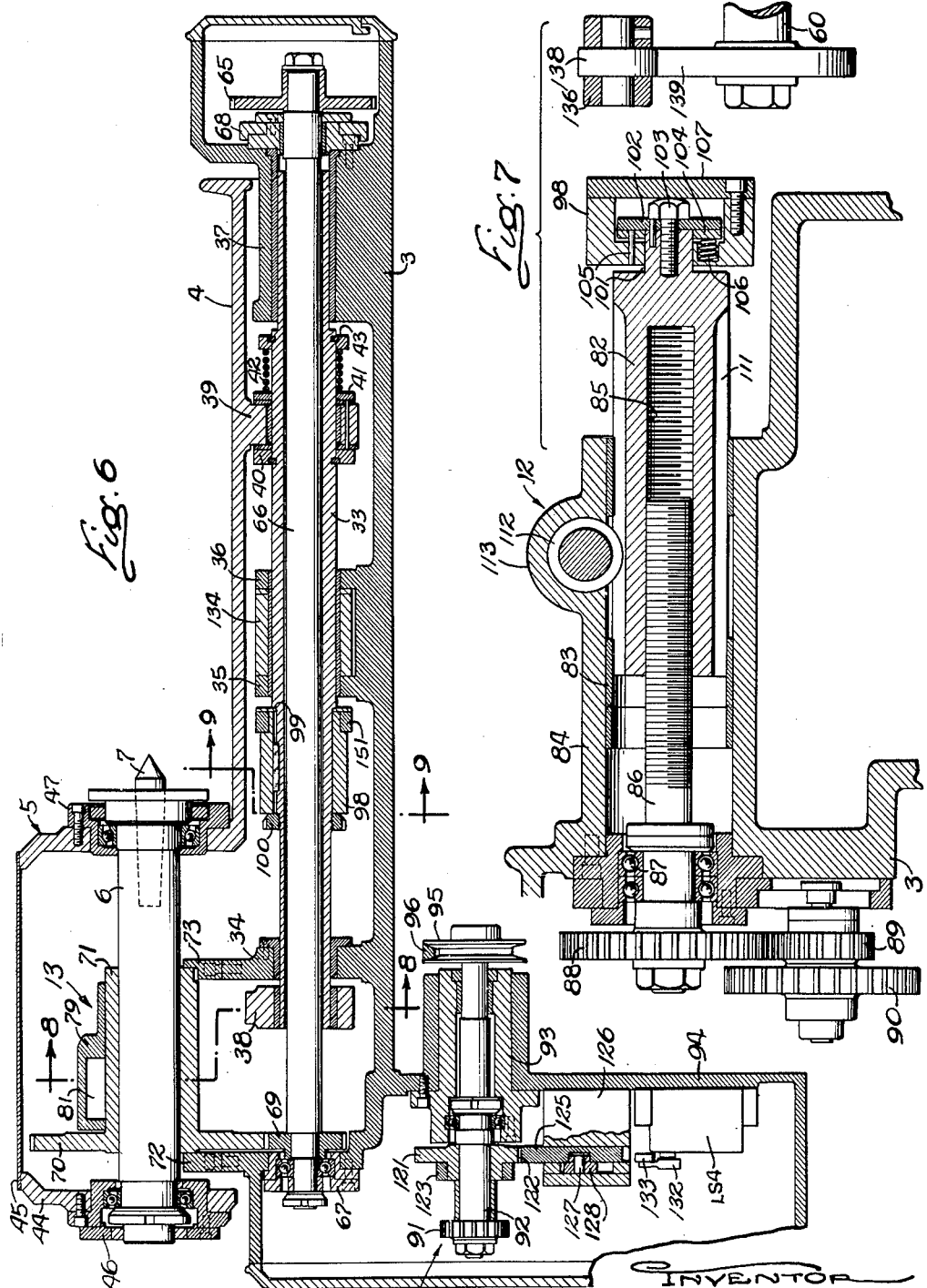

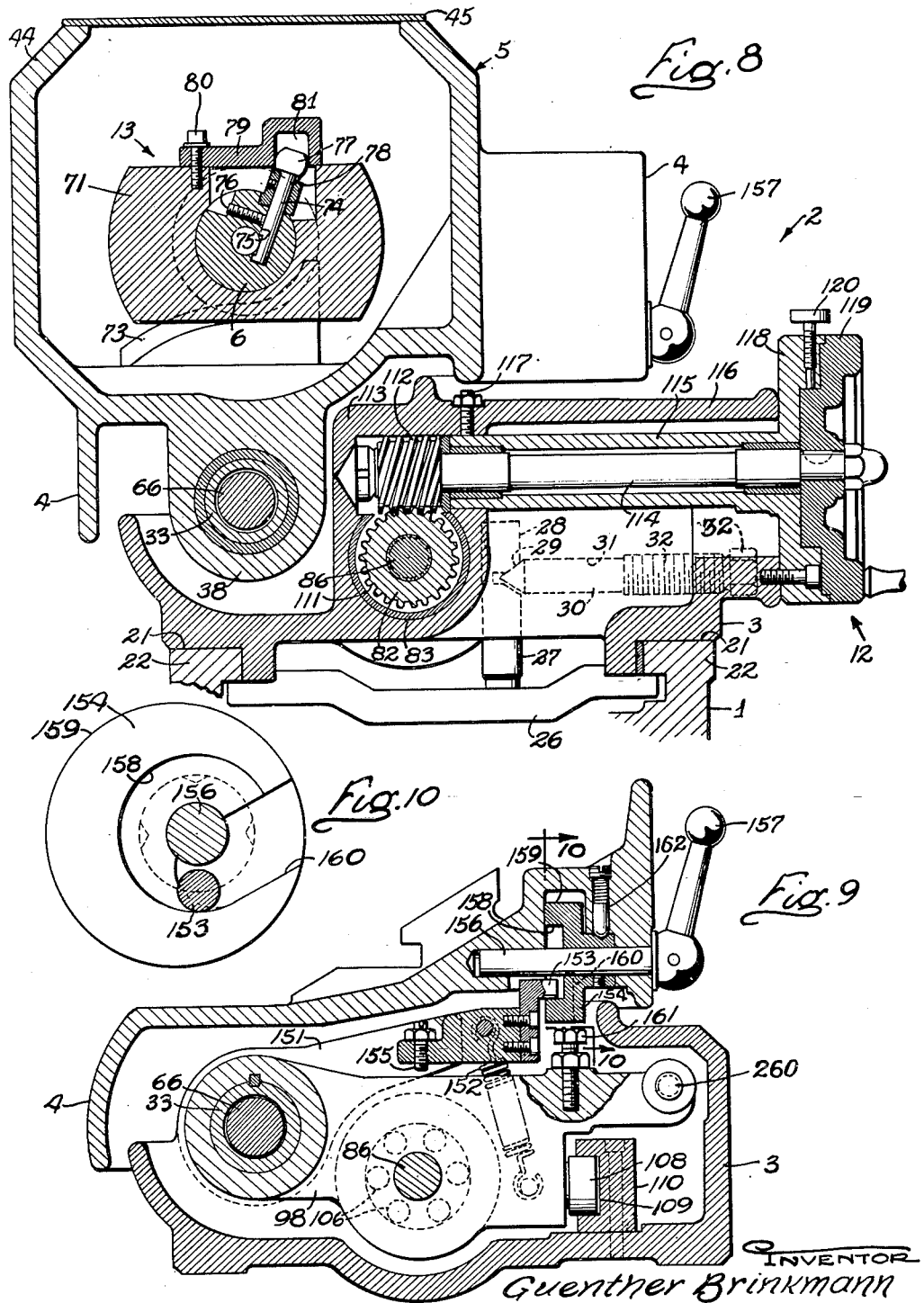

Filed Sept. 28, 1944　　　　　　　　　　15 Sheets-Sheet 8

INVENTOR
Guenther Brinkmann
By Carlson, Pitzner, Hubbard & Wolfe
ATTORNEYS

May 31, 1949.　　　G. BRINKMANN　　　2,471,406
GRINDING MACHINE

Filed Sept. 28, 1944　　　　　　　　　　　15 Sheets-Sheet 9

INVENTOR
Guenther Brinkmann
By Carlson, Pitzner, Hubbard & Wolfe
ATTORNEYS

May 31, 1949. G. BRINKMANN 2,471,406
GRINDING MACHINE
Filed Sept. 28, 1944 15 Sheets-Sheet 10

INVENTOR
Guenther Brinkmann
By Carlson, Pitzner, Hubbard & Wolfe
ATTORNEYS

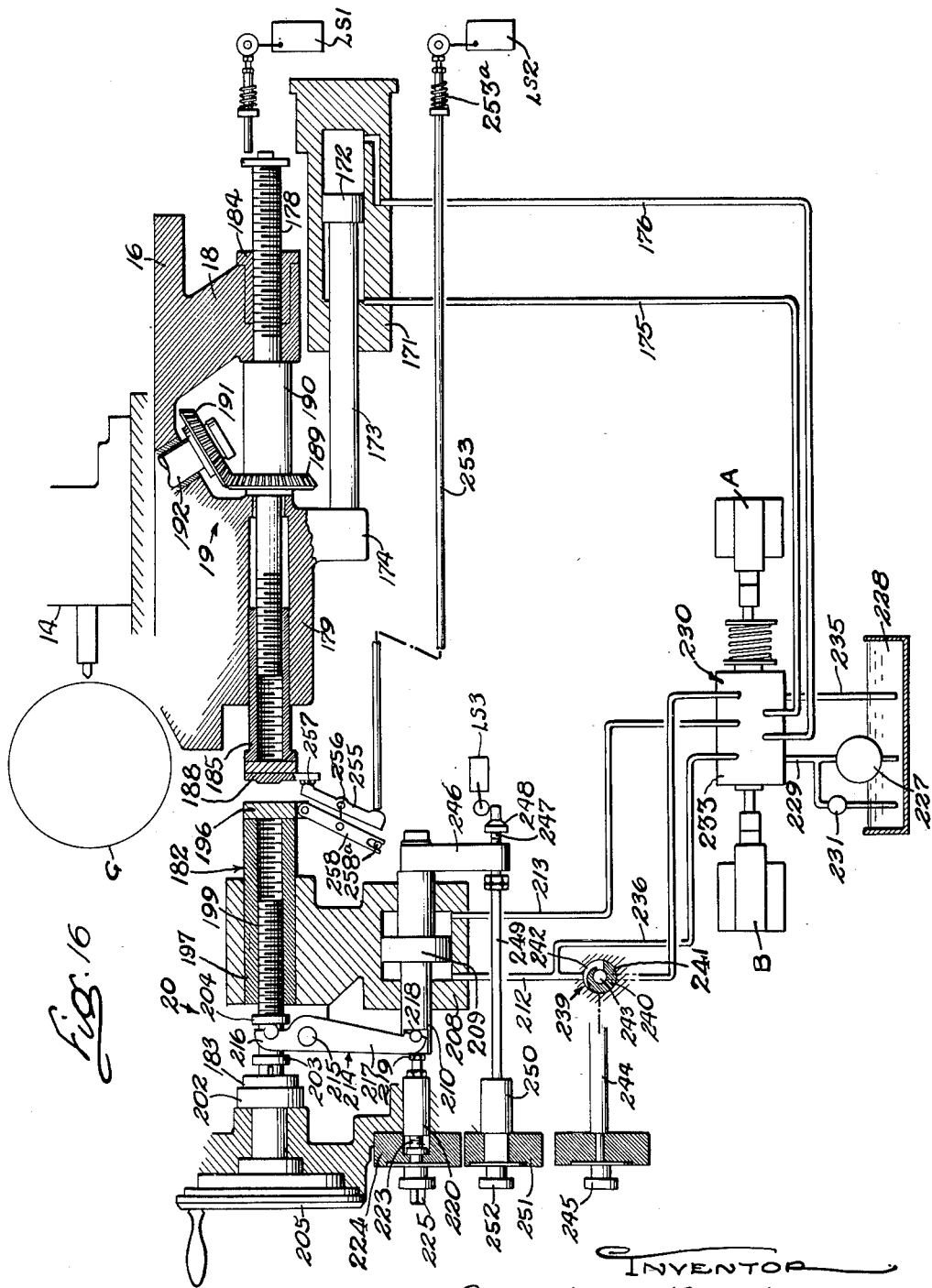

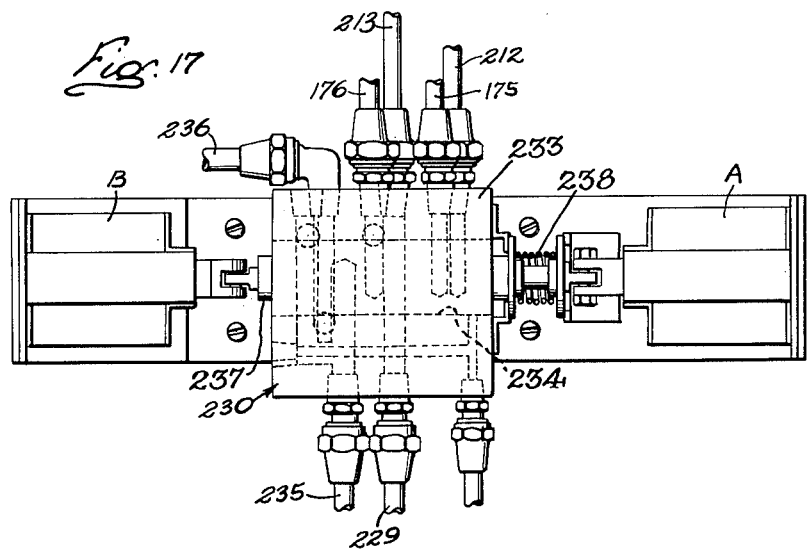
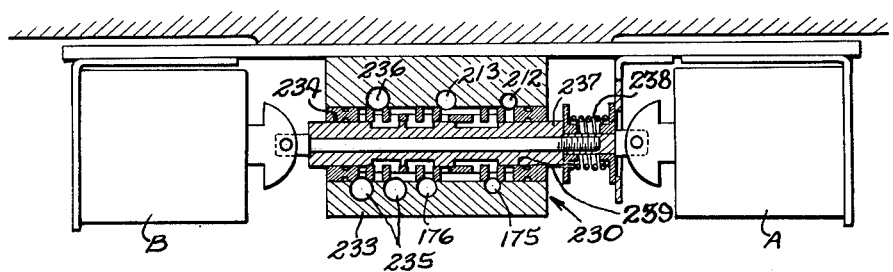
Fig. 19
| | VALVE PORT | | | SOLENOID | |
|---|---|---|---|---|---|
| | P | E | CLOSED | ENERGIZED | DEENERGIZED |
| GRIND | 212-175-176 | | 236 | A | B |
| RETRACT | 175 | 236-176 | 212 | | A & B |
| STOP | | 236 | 212-175-176 | B | A |
INVENTOR
Guenther Brinkmann
By Carlson, Pitzner, Hubbard & Wolfe
ATTORNEYS

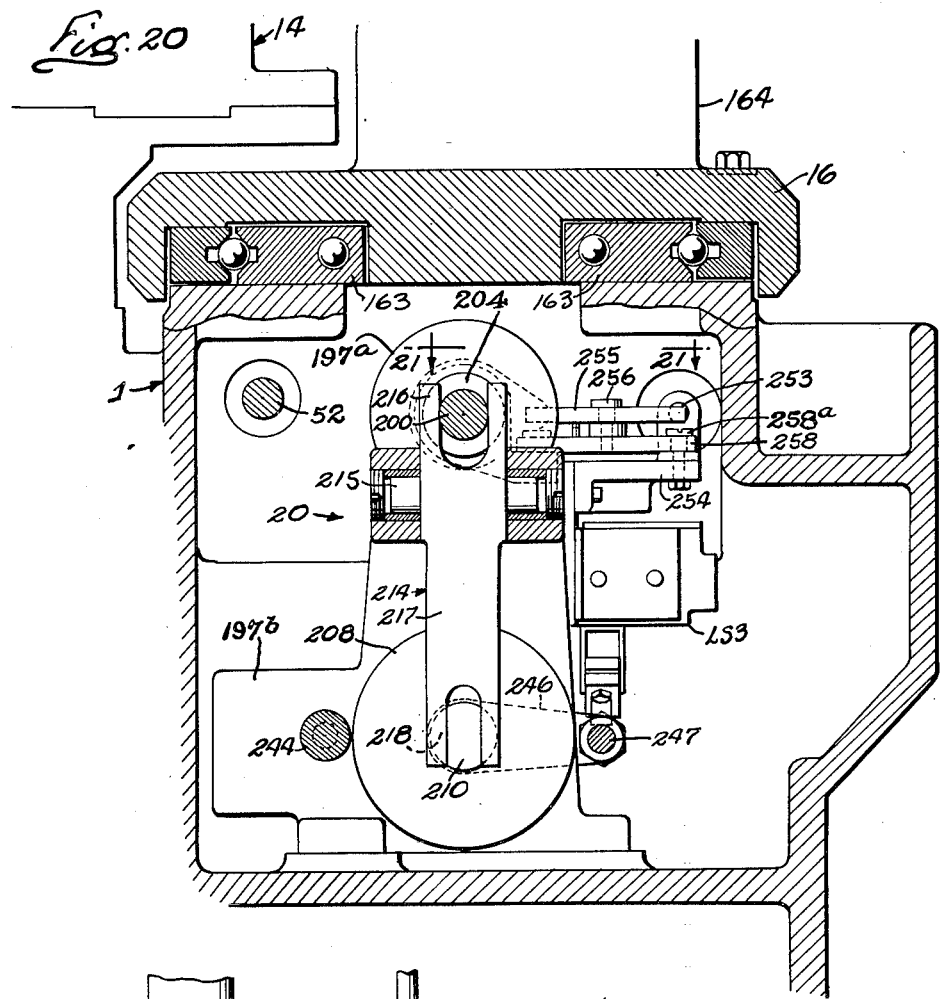
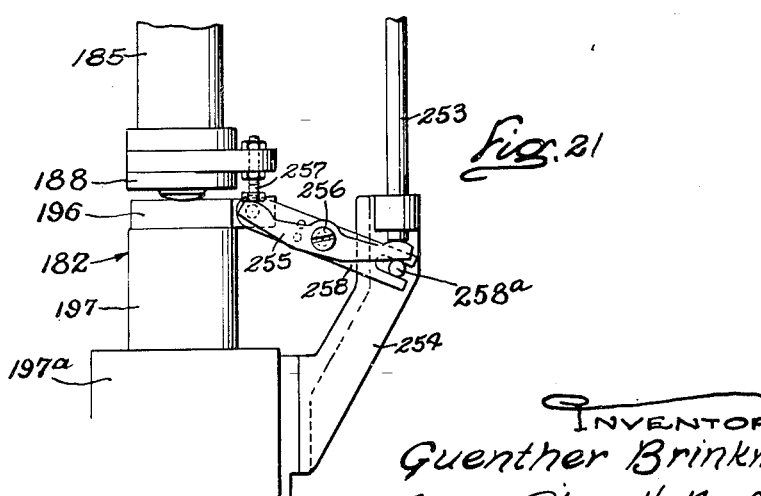

May 31, 1949.                G. BRINKMANN                2,471,406
                              GRINDING MACHINE
Filed Sept. 28, 1944                                15 Sheets-Sheet 14

Fig. 22.

LIMIT SWITCHES

LSTA - OPERATED BY TABLE
LS1 - ENGAGED WHEN WHEEL ALL THE WAY BACK
LS2 - ENGAGED WHEN WHEEL ENTERS PART DISENGAGED WHEN CLEARS PART
LS3 - SIZE SWITCH ENGAGED WHEN WHEEL IS AT FULL DEPTH
LS4 - ENGAGED WHEN INDEX PIN OUT
LS5 - ENGAGED EACH TIME INDEX OPERATES AND STOPS INDEX MOTOR
LSDF & LSDR - ON DRESSER

PUSHBUTTON PANEL

51 - START WHEEL, COOLANT HYD.
52 - MASTER STOP
54 - START DRESSER
55 - DRESSER - OFF - ON CONTINUOUS
56 - CYCLE HAND - AUTO
57 - START CYCLE
58 - STOP CYCLE
59 - INDEX

INVENTOR.
Guenther Brinkmann
By Carlson, Pitzner, Hubbard & Wolfe
Attorneys

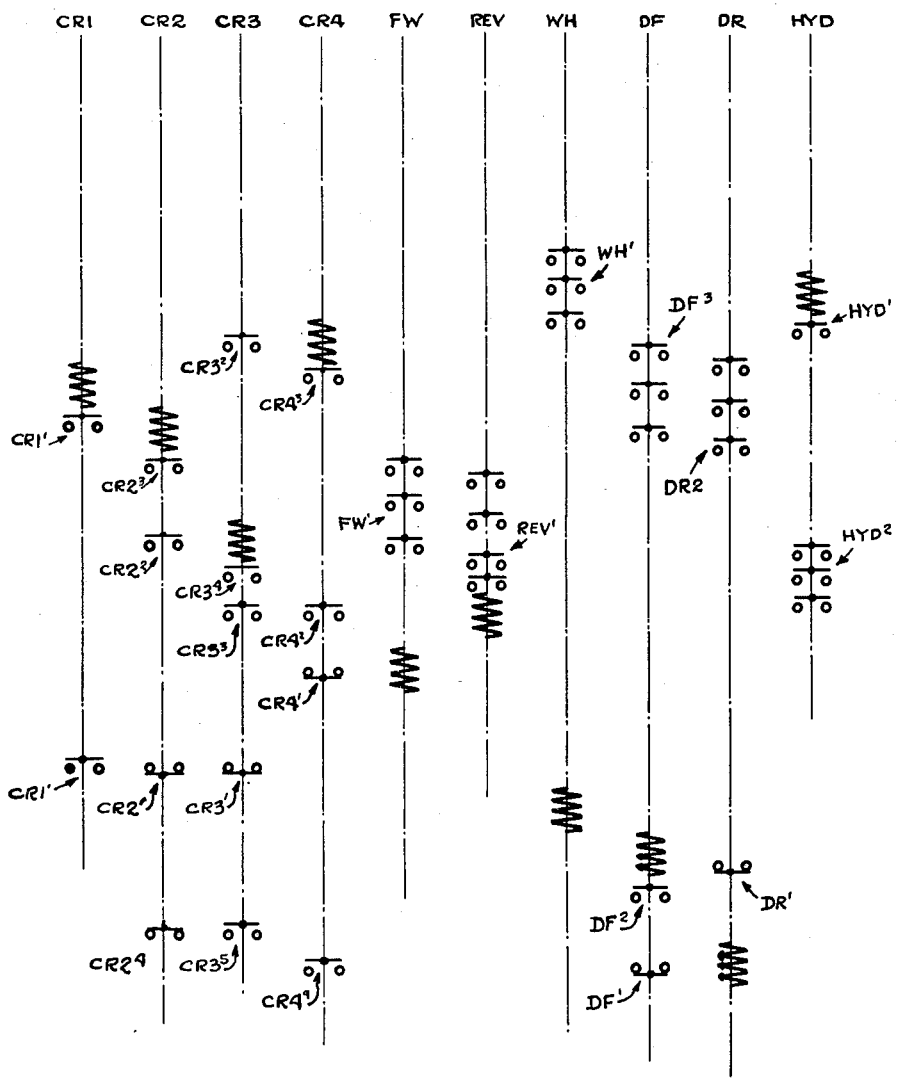

Patented May 31, 1949

2,471,406

UNITED STATES PATENT OFFICE 2,471,406

GRINDING MACHINE

Guenther Brinkmann, Detroit, Mich., assignor to Ex-Cell-O Corporation, Detroit, Mich., a corporation of Michigan Application September 28, 1944, Serial No. 556,114

23 Claims. (Cl. 51—105)

The present invention relates generally to improvements in grinding machines for relief grinding no-lead multiple thread milling cutters.

Such thread milling cutters commonly have either straight or helical longitudinal chip clearance gashes intersecting axially spaced annular grooves to define a plurality of annular series of relieved cutting teeth. The purpose of the present grinding machine is to relief grind the trailing portions of the teeth back of the cutting faces, and the longitudinal gashes and tooth grooves may be either preformed and finish ground, or ground out of solid stock. In the grinding operation, the cutter blank is rotated in operative relation to a suitable grinding wheel, and a relative relieving reciprocation in timed relation to the work rotation is imparted to the blank and the wheel once for each clearance gash during each blank revolution. A relative approach feed is imparted to the blank and the wheel during the grinding of each selected tooth groove until the teeth are ground to depth, and then the wheel is retracted from the blank and the latter is indexed axially to locate a succeeding tooth groove in position to be ground.

One of the objects of the present invention is to provide a grinding machine of the foregoing character having a novel cross feed mechanism which is automatically operable during each machine cycle to shift the grinding wheel relatively toward and from the cutter blank in a cycle comprising an initial rapid approach from a remote position, a grinding infeed for an initial tooth groove until ground to final size or depth, a dwell at the end of the infeed, a partial separating or retract movement after the dwell to permit relative axial indexing of the blank, a succession of infeed and retract movements respectively following the indexing movements for the grinding of consecutive tooth grooves, and a rapid return to and stop in the initial remote position after grinding of the final tooth groove.

Another object is to provide a new and improved grinding machine having a cross feed mechanism of the foregoing character, and in which the work blank is automatically indexed step-by-step in one axial direction and in timed relation to successive infeed movements of the grinding wheel, and returned axially to starting position upon return of the wheel into initial idle position, and in which the rotation of the work blank is automatically started at the commencement of the rapid approach of the grinding wheel, and interrupted upon return of the grinding wheel to remote position.

A further object is to provide a new and improved grinding machine in which the foregoing cycle may be interrupted at the will of the operator after the grinding of any tooth groove to effect the return of the grinding wheel past the retract position into remote inoperative position to permit dressing of the grinding wheel.

Another object is to provide a novel switch actuator for controlling the drive for the work spindle regardless of variation in the length of the infeed movement.

A further object is to provide a novel cross feed mechanism which is hydraulically operated and controlled, and which more particularly comprises a hydraulic actuator yieldably resisting each infeed movement to obtain an adjustable controlled rate of advance until interrupted by a positive stop.

Another object is to provide such cross feed mechanism in which the resistance actuator automatically becomes a positive actuator at the end of the infeed, and is operable through an adjustable predetermined distance to provide a controlled dwell.

A further object is to provide a novel cross feed mechanism in which the change in the approach movement between the wheel and the blank from rapid traverse to the grinding infeed is determined by engagement of the grinding wheel support with an intermediate stop yieldable at a controlled rate until the support engages a positive stop determining the final depth of cut.

Another object is to provide a new and improved hydraulic cross feed mechanism including a control orifice which has a comparatively large flow area for metering fluid therethrough at a relatively low differential pressure to control a hydraulic actuator yieldably resisting the infeed, and which at the end of the infeed is operable to control the continued movement of the actuator to provide a predetermined period of dwell.

A further object is to provide a novel hydraulic system for a cross feed mechanism having an orifice for controlling the rate of infeed and the period of dwell, and having means operable at the end of the dwell for automatically bypassing the orifice to permit rapid return of the grinding wheel into remote inoperative position.

Other objects and advantages will become apparent as the description proceeds.

In the accompanying drawings,

Fig. 3 is a perspective rear elevational view of the machine, a cover being removed to expose a control valve forming part of the cross feed mechanism.

Fig. 4 is a left end elevational view of the work supporting structure.

Fig. 5 is a fragmentary right end elevational view of the work supporting structure, partially in vertical section to illustrate the work spindle drive.

Fig. 6 is a longitudinal vertical sectional view through the work supporting structure, taken substantially along the line 6—6 of Fig. 4.

Fig. 7 is a fragmentary vertical sectional view of the work indexing mechanism, taken substantially along line 7—7 of Fig. 4.

Fig. 8 is a fragmentary transverse vertical sectional view taken substantially along line 8—8 of Fig. 6, and illustrating the tooth rib pick-up mechanism.

Fig. 9 is a fragmentary transverse vertical sectional view taken substantially along line 9—9 of Fig. 6.

Fig. 10 is a detail sectional view taken substantially along line 10—10 of Fig. 9.

Fig. 16 is a diagrammatic view illustrating the cross feed mechanism and the hydraulic operating system and control therefor.

Fig. 17 is an elevational view of a valve forming part of the hydraulic system.

Fig. 18 is an axial sectional view of the valve.

Fig. 19 is a diagram identifying the port connections of the valve in different positions of adjustment.

Fig. 20 is a vertical sectional view taken along line 20—20 of Fig. 14.

Fig. 21 is a horizontal plan view taken along line 21—21 of Fig. 20.

Fig. 22 is a diagrammatic representation of the electrical drive and control for the machine. Fig. 22a is a key diagram showing the relationship of the relays and switches incorporated in Fig. 22.

Figure 1:
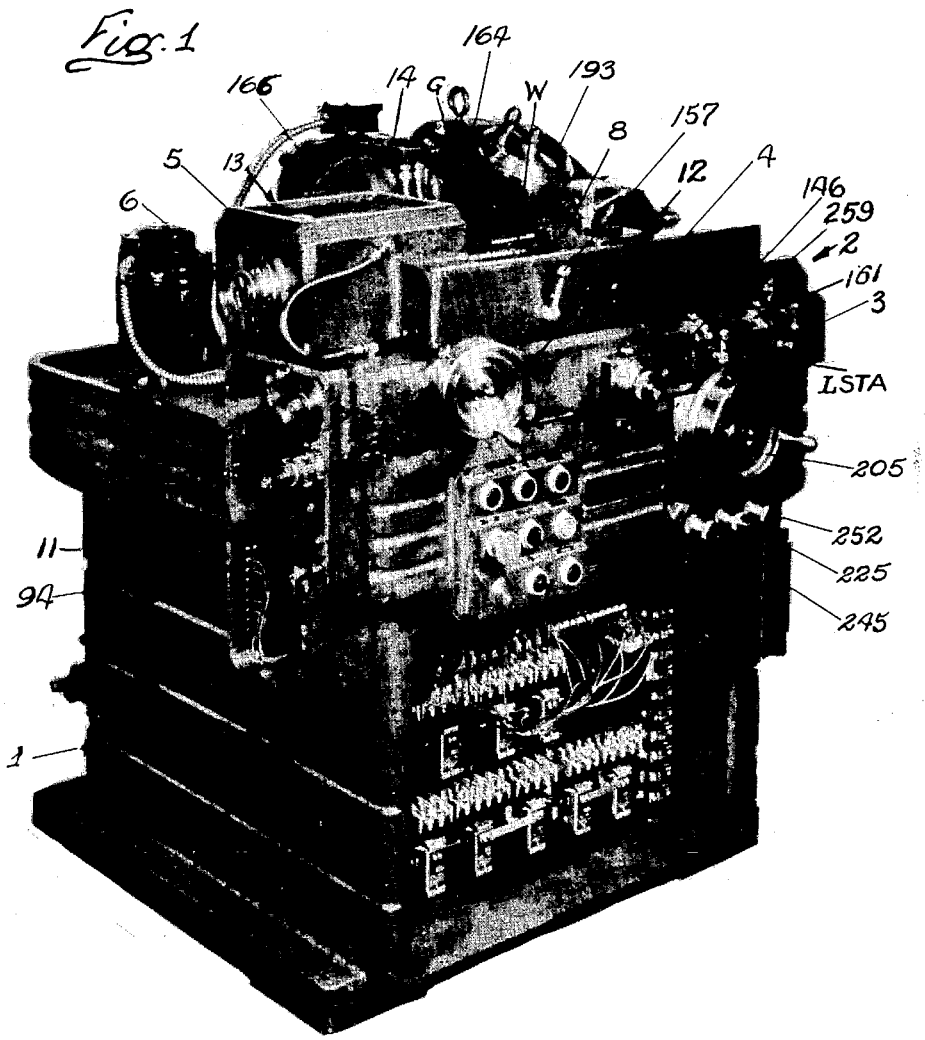
Figure 1 is a front perspective view of a grinding machine embodying the features of my invention, certain covers being removed to expose the electric panel and the gear drive for the work indexing.
Figure 2:
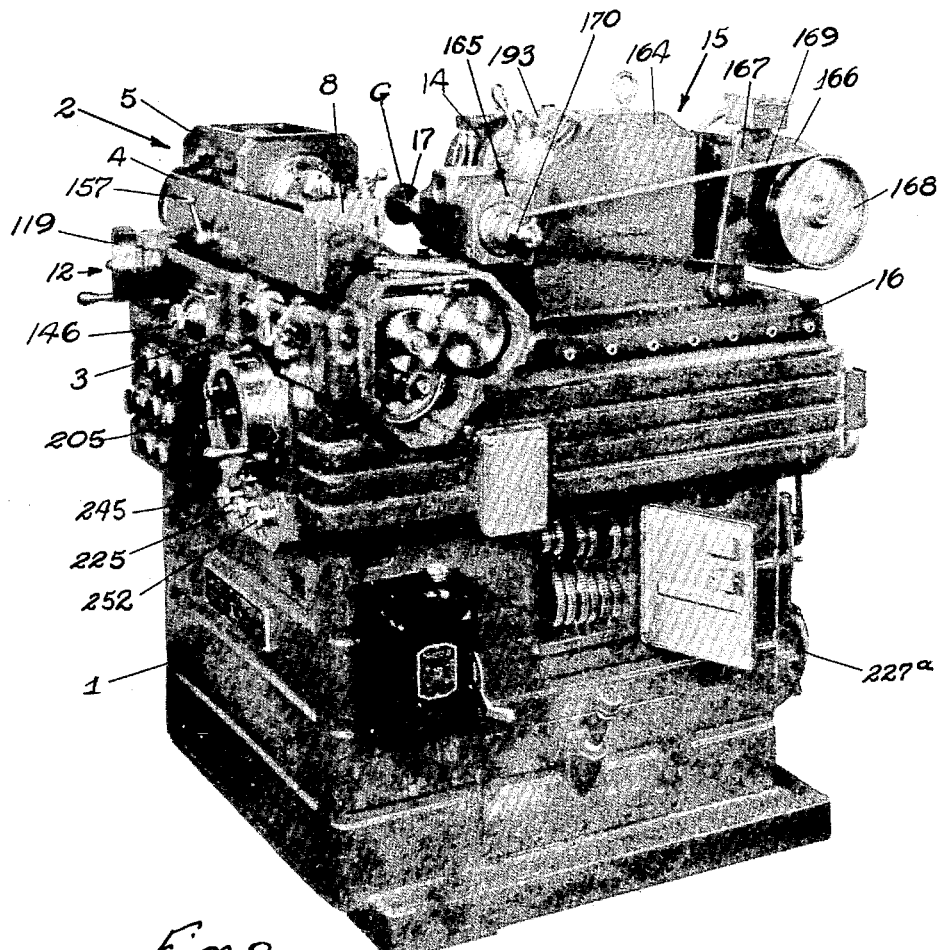
Fig. 2 is a right side perspective view of the machine, a cover being removed to expose part of the gear drive for the work spindle.

Referring more particularly to the drawings, the machine constituting the exemplary embodiment of the invention generally comprises a machine base 1. A work supporting structure 2 is mounted across the top of the base 1 at the front, and comprises an assembly of a sub-table 3 mounted on the base for longitudinal positioning adjustment, and a work support 4 pivotally mounted on the sub-table for longitudinal indexing movement and transverse relieving oscillation. Mounted on one end of the support 4 is a head stock 5 supporting a work spindle 6 and a live center 7. A tailstock 8 is adjustably mounted on the work support 4, and has a dead center 9 in alinement with the center 7. The work blank W to be ground is adapted to be mounted endwise in position for rotation on the centers 7 and 9, and to be connected through a suitable drive dog (not shown) to the spindle 6 for rotation therewith.

A relieving mechanism 10 is provided for oscillating the support 4 through a selectively adjustable distance in timed relation to the rotation of the work spindle 6, and may be rendered selectively operative or inoperative to oscillate the support depending on whether the work blank W is to be ground with or without relief.

An indexing mechanism 11 is provided for shifting the work support 4 step-by-step in one direction axially of the work spindle 6 to locate successive tooth grooves consecutively in grinding position, and for returning the support in the opposite direction into initial position at the end of the grinding operation. Associated with the indexing mechanism 11 is a pick-up mechanism 12 for locating the work blank, and particularly the initial tooth groove, in proper position to be ground. A phase control mechanism 13 is interposed in the spindle drive, and may be set selectively to adapt the machine for the grinding of workpieces having either straight or spiral gashes.

Mounted on the top of the base 1 (see Fig. 16) toward the rear is a suitable wheel dressing mechanism 14. A tool supporting structure 15 is mounted on the base 1 alongside the dressing mechanism, and comprises a cross slide 16 mounted for movement transversely of the work spindle 6 and at the front supporting a tool spindle 17 with a suitable grinding wheel G. The cross slide 16 is provided with a dresser feed mechanism 19, and is translatable between opposite limit positions by a hydraulic transmission forming part of a cross feed mechanism 20.

The cross feed mechanism 20 is operable to translate the cross slide 16 automatically in a cycle comprising a rapid approach from a remote dressing position, a forward feed from an adjustable intermediate point to advance the grinding wheel G gradually into the work to final size or depth, a dwell at the end of the infeed, and at the end of the dwell a retract movement to clear the grinding wheel G from the work so as to permit indexing of the next tooth groove into grinding position. The infeed and partial retract movements are repeated for all of the tooth grooves of the work blank, and after the last groove has been ground to final depth, the cross slide is returned without interruption to its remote position wherein the grinding wheel may be dressed, and the indexing mechanism 11 is reversed to return the work spindle 6 into initial position for unloading and reloading.

WORK SUPPORTING STRUCTURE

The sub-table 3 constitutes the base of the work supporting structure 2, and is formed along opposite sides with parallel longitudinal guideways 21 engaging suitable guides 22 on the top of the base 1. To provide means for adjusting the position of the sub-table 3, a longitudinal gear rack 23 is secured to the underside thereof, and meshes with a pinion 24 on a stub shaft 25 journaled in and extending through the front wall of the base 1. The outer end of the stub shaft 25 is suitably squared for the reception of a hand tool. It will be understood that the sub-table 3 is adjusted only in the initial set-up of the machine to position the work blank W in proper relation to the grinding wheel G.

Suitable clamping means are provided at opposite ends of the sub-table 3 to clamp the latter in position of adjustment. Only one of these clamping means is shown, but the two clamping means are alike in construction. Each comprises a clamping bar 26 extending transversely between and adapted for engagement underneath the guides 22. The bar 26 has a vertical post 27 which extends upwardly into a bore 28 in the sub-table 3 and which is formed in one side with a tapered notch 29. A wedge member 30 is slidably disposed in a transverse bore 31, and has a pointed end normally in wedging engagement with the upper side of the notch 29. The wedge member 30 is adapted to be tightened by a bolt 32 threaded in the outer end of the bore 31 into end engagement therewith and accessible from the front of the machine.

The work support 4 is mounted for oscillation about, and for longitudinal translation with, a tubular bearing member 33 slidably supported in suitable upstanding bearing lugs or bosses 34, 35, 36 and 37 on the sub-table 3. In the present instance, the lugs are formed with axially alined bores receiving suitable bushings in which the tubular bearing member 33 is guided. The work support 4 has two longitudinally spaced bearing lugs 38 and 39 with inserted bushings rotatably receiving the tubular bearing member 33. To constrain the work support 4 against relative sliding movement, the lug 39 is confined between a fixed peripheral collar 40 on the member 33 and a friction collar 41. A coiled compression spring 42, seated against a fixed collar 43, acts on the collar 40 to urge the latter against the lug 39.

The head stock 5 comprises an upstanding housing 44 formed integral with one end of the work support 4 and closed at the top by a cover plate 45. The work spindle 6 extends through the head stock longitudinally of the work supporting structure 2 and is journaled at opposite ends in suitable antifriction ball bearings 46 and 47 mounted in opposite end walls of the housing 44.

Work spindle drive

The work spindle 6 is adapted to be driven from an electric motor 48 mounted on the rear of the base 1 and connected through a belt 49 to a stepped pulley 50 on the rear end of a stub shaft 51. In the present instance, the motor 48 is supported on the rear of the machine base 1 for pivotal adjustment to tension the belt 49. The shaft 51 is connected through a universal joint (not shown) to an intermediate shaft 52 extending forwardly through the base 1. A worm shaft 54 is connected through a universal coupling 53 to the shaft 52, and is suitably journaled in a depending gear housing 55 on the underside of the sub-table 3 within the machine base 1. A pin 56 on the base 1 slidably engages in a groove 57 in the gear housing 55 to support the latter rigidly against lateral deflection. It will be seen that the worm shaft 54 is connected for rotary drive through the shaft 52 to the transverse shaft 51 in all positions of adjustment of the sub-table 3.

Fixed on the worm shaft 54 is a worm 58 meshing with a worm wheel 59 on a shaft 60 journaled in a gear housing 61 on the right end of the sub-table 3. The shaft 60 is connected through a train of speed change gears 62, 63, 64 and 65 within the gear housing 61 to the right end of a shaft 66 extending coaxially through the tubular bearing member 33. Suitable bearings 67 and 68 are provided for supporting opposite ends of the shaft 66.

Secured to the left end of the shaft 66 is a gear 69 which meshes with a gear 70 having an elongated hub 71 rotatably and slidably supported on the work spindle 6. In the normal indexing movement of the work support 4, for example to the right, and the return movement to the left, the spindle 6 will slide axially through the gear hub 71, the latter being constrained against axial movement between spaced upstanding webs or flanges 72 and 73 on the sub-table 3.

Phase control mechanism

The phase control mechanism 13 serves to connect the spindle 6 for rotary drive with the gear 70, and is adjustable to effect rotation of these elements as a unit when the work blank to be ground has straight gashes, or to superimpose an additional rotation on the spindle in timed relation to the axial translation when the work blank has spiral gashes, in order to compensate for the inclination of these gashes and thereby maintain the spindle and the relieving mechanism 10 in correct operative relation.

The control mechanism 13 (see Fig. 8), in the form disclosed, comprises a drive pin 74 extending transversely into a bore 75 in the spindle 6 and secured in position by a set screw 76. The outer end of the pin 74 is provided with an enlarged rounded spherical follower 77 separated from the spindle 6 by a spacer 78. A guide plate 79 is mounted on the flattened top of the gear hub 71 for angular adjustment about a clamp screw 80, and is formed in the underside with an elongated groove 81 extending generally longitudinally of the spindle 6 and slidably receiving the follower 77. When the guide plate 79 is adjusted to locate the groove 81 in parallel relation to the spindle 6, axial movement of the latter will not alter the angular phase relation, and the gear 70 and spindle will rotate as a unit. However, if the guide plate 79 is adjusted to locate the groove 81 selectively at an angle to the spindle 6, the groove through coaction with the follower 77 will rotate the spindle in the gear hub 71 in timed relation to the axial movement of the spindle. In either case, the plate 79 is adjusted in accordance with the angle of the work gashes and, hence, is located in parallel relation to the spindle 6 for straight gashes and at an appropriate angle to the spindle for inclined gashes. The phase control mechanism 13 is generally similar in construction and operation to that disclosed in copending application Serial No. 504,689, filed October 2, 1943, by Harold N. Seyferth, now Patent No. 2,439,106, dated April 6, 1948.

Indexing mechanism

The indexing mechanism 11 (see Figs. 4 and 6) is operative to shift the work support 4 step-by-step axially of the spindle 6, through a distance in each step corresponding to the pitch of the tooth grooves of the work as the grooves are ground successively to final depth. In the preferred form, the indexing mechanism 11 comprises an elongated lead nut 82 slidably disposed in bushings 83 within a tubular guide 84 formed integrally with the left end wall of the sub-table 3. The lead nut is formed with an axial threaded bore 85 in engagement with an adjusting screw 86 suitably journaled at one end in ball bearings 87. The outer end of the screw 86 is connected through a train of speed change gears 88, 89, 90 and 91 to a stub shaft 92 suitably journaled in a bearing sleeve 93 in the inner wall of a depending gear housing 94 on the sub-table 3. The inner end of the shaft 92 has a pulley 95 connected through a belt 96 to an electric indexing motor 97 located within the machine base. It will be evident that upon operation of the motor 97 in either forward or reverse direction, the screw 86 will be rotated to shift the lead nut 82 axially.

The inner end of the lead nut 82 is coupled to the work support 4 for translation axially of the spindle 6. In the present instance, the connection comprises a transverse arm 98 pivotally connected intermediate its ends to the nut 82, and anchored at the inner end to the tubular bearing member 33 for axial movement therewith. More particularly, the inner end of the transverse arm 98 is keyed to the member 33 in position against a shoulder 99 by a lock nut 100. Intermediate its ends, the arm 98 is apertured to receive a reduced axial extension 101 on the inner end of the lead nut 82. A plate 102 is secured to the end of the extension 101 by means of a bolt 103, and a friction plate 104 encircling the extension 101 and connected thereto by a pin 105 is urged into bearing engagement with the plate 102 by a plurality of coiled compression springs 106. A wear plate 107 is bolted to one side of the arm 98 in bearing engagement with the head of the bolt 103, thereby constraining the arm 98 for movement with the lead nut 82.

The forward end of the arm 98 is provided with a roller 108 riding in a guide groove 109 in a bar 110 secured to the sub-table 3 and extending longitudinally thereof. Thus, the arm 98 is confined against oscillation and is constrained to move axially with the lead nut 82 and the tubular bearing member 33 to shift the work support 4 upon rotation of the screw 86.

Normally the lead nut 82 (see Figs. 7 and 8) is held against rotation by the pick-up mechanism 12. In this mechanism, the exterior of the feed nut 82 is formed to constitute a spur gear 111 with elongated teeth in mesh with a skew gear 112 within a gear casing 113 formed integral with the tubular guide 84. The skew gear 112 is fixed on the inner end of a shaft 114 which is suitably journaled in and extends through an elongated bearing sleeve 115 secured in a housing 116 on the front of the sub-table 3. A set screw 117 is provided for securing the bearing sleeve 115 against rotation. The outer end of the bearing sleeve 115 is formed with a flanged backing plate 118 receiving a a handwheel 119 on the shaft 114. Upon rotation of the handwheel 119, the gear 112 will rotate the lead nut 82 to shift the work support 4, independently of the indexing drive, for pick-up or positioning of the tooth grooves in proper grinding relation to the grinding wheel G. A set screw 120 is provided for locking the handwheel 119 in position of adjustment, and when the wheel is locked the gear 112 acts to key the lead nut 82 against rotation, while permitting axial translation thereof upon rotation of the screw 86.

In each indexing operation, the gear 91 is rotated through one complete revolution, and the train of gears 89 to 91 is selected to shift the lead nut 82 through the desired distance. The control means for this purpose preferably comprises an index disk 121 fixed on the shaft 92 and formed in the periphery with a notch 122. Also fixed on the hub of the disk 121 for rotation with the shaft 92 is a cam 123 controlling a switch LS5 through a spring-actuated follower 124. A locking plunger 125 is slidably guided in a bearing bracket 126 within the housing 94 for engagement in the notch 122, and is pivotally connected by means of a pin 127 to a lever 128 in turn pivoted at 129 to the bracket. One end of the lever 128 is connected to a coiled tension spring 130 anchored to the wall of the housing 94 and tending to urge the plunger 125 into engagement with the disk 121. The other end of the lever 128 is connected through a link 130 to the movable core 131 of a solenoid C. Mounted on the inner wall of the housing 94 is a switch LS4 having an actuating lever 132 with a roller 133 underlying the plunger 125.

In operation, upon energization of the solenoid C the plunger 125 is retracted from the index disk 121, thereby releasing the latter for rotation, and at the same time actuating the switch LS4 to institute operation of the index motor 97. As a result, the disk 121 and the cam 123 will start to rotate through one complete revolution, and will rotate the lead screw 86 to shift the work support 4 through one indexing step. Near the end of the rotation, the cam 123 will engage the follower 124 to actuate the switch LS5, thereby interrupting the index motor circuits and de-energizing the solenoid C. The motor 97 will coast to reactuate the switch LS5. Upon deenergization, the magnet C will release the lever 128 so as to permit the spring 130 to urge the plunger 125 into peripheral bearing engagement with the index disk 121. The switch LS4, however, will remain closed until the disk 121 completes one revolution, at which time the plunger 125 will engage the notch 122. Thereupon the switch LS4 will be opened to interrupt the circuit for the solenoid B to effect shifting of the valve 230 into "grind" position for the next infeed movement.

*Relieving mechanism*

The work support 4 is adapted for oscillation by the relieving mechanism 10 about the tubular bearing member 33 in any indexed position, once for each tooth, during each revolution of the spindle 6. The extent of oscillation is subject to adjustment, depending on the desired relief. The relieving mechanism 10 may be rendered ineffective when the machine is to be used for grinding work blanks without relief, and the work support 4 may be disengaged from the relieving mechanism and swung into inoperative position to afford access to the mechanism.

Figure 11:
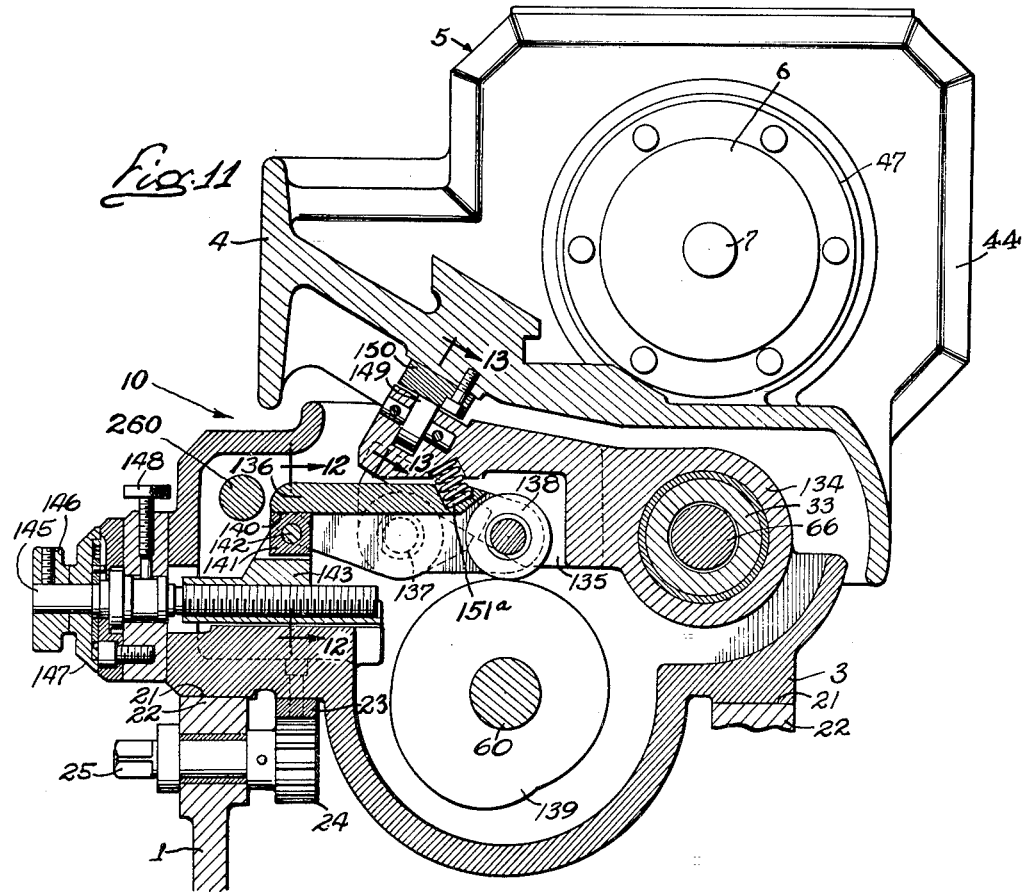
Fig. 11 is a fragmentary transverse vertical sectional view through the work supporting structure, and illustrating the relieving mechanism.

The relieving or back-off mechanism comprises an intermediate member (see Figs. 11 and 12) in the form of an arm 134 rotatably supported at one end for swinging movement about the tubular bearing member 33, and constrained against axial movement with the member 33 by the two bearings lugs 35 and 36. The forward end of the lever 134 is formed with depending side flanges defining a guide recess 135. A cam lever 136 extends rearwardly into the recess 135, and is pivoted therein intermediate its ends, as at 137. A cam roller 138 is journaled on the rear end of the lever 136, and is in peripheral bearing engagement with a suitably contoured relief cam 139 fixed on the inner end of the shaft 60.

The forward end of the lever 136 is channel-shaped to constitute a radial guide 140 slidably engaged by a block 141 pivotally connected by a pin 142 to an adjusting slide 143. The pin 142 constitutes an adjustable stationary fulcrum for the lever 136. The slide 143 is suitably guided for adjustment transversely of the pivot 137 between parallel spaced guides 144 on the subtable 3, and is adapted to be adjusted by means of a screw 145 rotatably anchored in the subtable, and having an adjusting knob 146 and a micrometer dial 147 on the outer end. A set screw 148 is provided for securing the screw 145 in position of adjustment. By adjusting the slide 143, and hence the fulcrum 142, the length of the forward moment arm of the lever 136 may be varied to adjust the throw of the movable fulcrum 137 and, therefore, the throw of the arm 134 by the relieving cam 139.

Figures 12, 13:
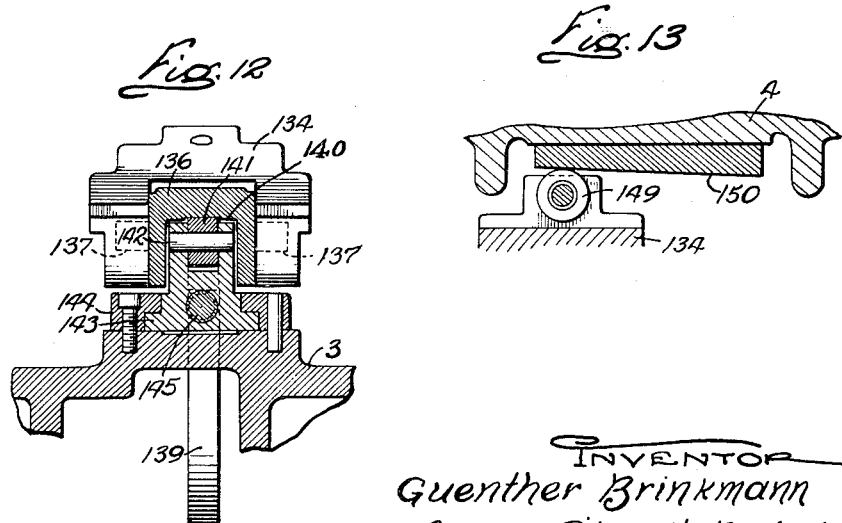
Fig. 12 is a detail sectional view taken substantially along line 12—12 of Fig. 11.
Fig. 13 is a fragmentary sectional view taken along line 13—13 of Fig. 11.

The intermediate member or arm 134 provides a rest for the work support 4. In the present instance, a roller 149 is journaled in the forward end of the intermediate member 134, and engages an elongated wear bar 150 bolted to and extending longitudinally of the underside of the forward portion of the work support 4. When grinding cylindrical work blanks, the bar 150 is provided with a straight track parallel to the pivotal axis of the support. If it should be desired to grind tapered work blanks, a bar 150 with an inclined track is bolted to the work support 4 as shown in Fig. 13.

A coiled compression spring 151ª is interposed between the intermediate member 134 and the cam lever 136 to urge the roller 138 toward the relieving cam 139.

It will be understood that upon each rotation of the relieving cam 139, which is timed by the change gears 62 to 65 to complete one revolution for each tooth to be relieved, it will act through the lever 136 and the intermediate member 134 to oscillate the work support 4 about the tubular bearing member 33 through a predetermined angular distance. The extent of the relieving movement may be varied by adjusting the stationary fulcrum 142 for the lever 136.

Means is provided (see Figs. 9 and 10) for locking the work support 4 in operative association with the relieving cam 139 when the work blank is to be relief ground, and for disassociating the work support and the relieving mechanism 10 when the work blank is to be ground without relief. In the form shown, this means comprises a positioning lever 151 which is rotatably supported at one end on a reduced end portion of the hub of the arm 98 for oscillation about the tubular bearing member 33. The other or forward end of the lever 151 is urged toward the arm 98 by an interconnecting tension spring 152 and is provided with a forwardly projecting pin 153 adapted for cooperation with a locating cam 154. A stop screw 155 is adjustably threaded through a flange on the lever 151 for engagement with the arm 98 to limit the movement of the lever in response to the action of spring 152.

The cam 154 is of the annular type, and is secured axially to a shaft 156 journaled in the front of the work support 4 and provided with a hand lever 157. The cam 154 is formed with an inner peripheral eccentric cam surface 158 and an external peripheral cam surface 159 interconnected by a radial slot 160. In one position of the cam 154, the slot 160 is located in registration with the pin 153 to permit the work support 4 to be disengaged from the lever 151 and swung upwardly and rearwardly for the purpose of affording access to the relieving mechanism 10. Upon rotation of the cam 154 out of the release position into relief grinding position, the slot 160 will pick up the pin 153 and establish engagement thereof with the inner cam surface 158. In this position of adjustment of the cam 154, the bar 150 will engage and ride on the roller 149 and, hence, the work support 4 will be in operative association with the relieving cam 139. Upon rotation of the cam 154 into a third position, the external cam surface 159 will engage an adjustable stop bolt 161 in the forward end of the arm 98 to lift the work support 4 out of operative association with the relieving mechanism 10. A spring actuated detent 162 is engageable in recesses in the hub of the cam 154 to locate the latter selectively in either of the three positions of adjustment.

TOOL SUPPORTING STRUCTURE

The cross slide 16 of the tool supporting structure 15 is mounted on suitable ways 163 on the top of the base 1 and extending transversely of the work support 4. Preferably a series of ball bearings are interposed between the ways 163 and the slide 16 to complete the bearing relationship, and to reduce sliding resistance to a minimum.

Formed on the forward end of the tool slide 16 is an upstanding housing 164. A spindle bracket 165 is adjustably secured to the front face of the housing 164 and supports the tool spindle 17. The spindle is adapted to be driven at a high rate of speed from an electric motor 166 mounted on a plate 167 pivotally supported on the slide 16 at the rear of the housing 164. The motor 166 has a pulley 168 connected by a belt 169 to a pulley 170 on the spindle 17.

The tool slide 16 may be reciprocated by any suitable means, and in the present instance is adapted to be translated along the ways 163 by a suitable hydraulic actuator of the differential type comprising a cylinder 171 mounted within and connected at one end to the rear wall of the machine base 1 and a piston 172 reciprocable therein. The piston has a piston rod 173 extending crosswise of the base 1 and anchored at its forward end to a depending lug 174 on the slide 16. By reason of the transverse area of the piston rod, the rod end face of the piston 172 is approximately equal to one-half of the head end face.

Fluid under pressure is adapted to be supplied through suitable passages 175 and 176, respectively, to opposite ends of the cylinder 171. As hereinafter more fully described, when fluid is supplied simultaneously through both passages, the piston 172 will be moved in a forward direction, and when fluid is supplied through the passage 175 to the forward end of the cylinder 171 and exhaust fluid is displaced from the rear end through the passage 176, the piston will move in a rearward direction.

The tool slide has three main positions of operation, namely, a remote limit position in which the grinding wheel G is fully retracted from the work to permit loading and unloading, and located in position to be trued by the dressing mechanism 14, a forward grinding position in which the grinding wheel is in operative engagement with the work and which is limited by a positive stop under the control of a size control wheel 205, and an intermediate or partial retract position in which the grinding wheel is merely retracted from the work sufficiently to permit axial indexing of the latter from tooth groove to groove.

The rearward remote and forward operative positions of the slide 16 are determined by an intermediate abutment member 178 which is adjustably carried by depending lugs 179, 180, and which is reciprocable between and respectively into opposite end engagement with a rear positive stop 181 and a forward intermediate stop 182 adapted to coact with a front positive stop 183 to determine the depth of cut. The intermediate abutment member 178 is, of course, in axial alinement with the stops 181 and 182, and consists of an adjusting screw threaded through a nut 184 fixed in the lug 180. The forward end of the abutment member 178 is in threaded engagement with an elongated tubular nut 185 axially slidable in a bushing 186 secured in the front end of the lug 179, and constrained against rotation by a spline key 187. Rigidly connected to the forward end of the nut 185 is a replaceable hardened abutment plate 188 adapted for engagement with the intermediate stop 182. The construction is generally similar to that disclosed in my copending application Serial No. 435,224, filed March 18, 1942, now Patent No. 2,389,590, dated November 27, 1945.

Dresser feed and compensation

The grinding wheel slide 16 is adapted to be fed toward the dressing mechanism 14 in a dresser feed of any desired extent by rotating the intermediate abutment member 178. In the present instance, the means for this purpose comprises a bevel gear 189 splined for relative axial movement to the intermediate abutment member 178 and confined in a fixed position of rotation between the lugs 179 and 180 by a spacer sleeve 190. The bevel gear 189 meshes with a bevel gear 191 on the lower end of an adjusting shaft 192 journaled in and extending upwardly through the housing 164. A hand wheel 193 with a suitable micrometer dial 194 is secured to the upper end of the shaft 192. It will be understood that upon operation of the hand wheel 193 to rotate the abutment members 178 in a clockwise direction, looking from the front, the rear end threaded section through coaction with the nut 184 will shift the slide 16 rearwardly, and thus advance the grinding wheel G toward the dressing mechanism 14 by the amount to be removed in the dressing operation.

Upon imparting a dresser feed adjustment to the intermediate member 178, the forward end threaded portion will retract the nut 185 so that in its forward movement the slide 16 will advance through an added distance for engagement with the intermediate stop 182. The forward threaded portion of the abutment member 178 has double the thread pitch of the rear threaded portion so that the dresser compensating feed imparted to the slide 16 will be twice the dresser feed to maintain the forward cutting edge of the wheel G in unaltered relation to the work.

The dresser mechanism 14 is power operated, and has a drive motor 195, but the operation is instituted manually. The dressing mechanism 14 per se forms no part of the present invention, and may be of any suitable type, such for example as that disclosed in the patent to Seyferth and Snader, No. 2,281,719.

Cross feed control mechanism

The intermediate stop 182 is normally projected rearwardly through an adjustable distance from association with the front positive stop 183 to determine the extent of the grinding infeed. In operation, when the wheel slide 16 is advanced from the remote or dressing position toward grinding position, it will move initially at a rapid traverse rate until the abutment plate 188 engages the intermediate stop 182, and thereafter the slide will continue to move forwardly with the intermediate stop at a controlled feed rate until limited by the positive stop 183.

The intermediate stop 182 comprises a hardened abutment plate 196 removably secured to the rear end of an elongated tubular sleeve nut 197 which extends slidably through a tubular bearing 197ª rigid with a bracket 197ᵇ in machine base 1 and which is constrained against rotation by a spline key 198. A feed depth adjusting screw 199 is threaded into the forward end of the nut 197 for axial movement therewith. The forward end of the screw 199 has a shaft extension 200 slidably splined for relative axial movement in the rear end of a stub shaft 201 journaled in the front wall of the base 1. The inner end of the stub shaft 201 is formed with a peripheral end flange which is disposed against an end thrust bearing 202 and constitutes the front positive stop 183.

The shaft extension 200 of the adjusting screw 199 is formed with two axially spaced peripheral collars 203 and 204 constituting shoulder abutments. The forward abutment 203 is separated from the positive stop 183 when the intermediate stop 182 is disposed in retracted position for engagement by the abutment member 178, and is adapted for engagement with the positive stop to limit the forward movement of the wheel slide 16 when the work has been ground to desired size. A hand wheel 205 is secured to the stub shaft 201 at the front of the machine base 1 for rotating the adjusting screw 199 and is adapted to be locked in position of adjustment by suitable clamping means 206. A micrometer dial 207 is adjustably associated with the wheel 205. It will be understood that upon adjustment of the screw 199, the distance between the plate 196 and the shoulder 203, and hence the overall effective length of the intermediate stop 182, will be varied to adjust the depth of feed. Thus, if the length of the intermediate stop 182 is reduced, the wheel slide 16 will be permitted an additional increment of movement toward the work axis.

Forward movement of the intermediate stop 182 is retarded at an adjustable controlled rate so that upon engagement by the abutment plate 188 on the forward end of the intermediate abutment member 178, the slide 16 will be constrained to move forwardly in an infeed movement during which the grinding wheel G acts to grind the work blank W in a plunge cut to size. Thus, the point of engagement of the plate 188 with the plate 196 determines the change from rapid approach to feed in the forward movement of the wheel slide 16.

The movement of the stop 182 is retarded by a hydraulic resistance actuator comprising a cylinder 208 rigid with the bracket 197ᵇ, and a piston 209 reciprocable therein and having piston rods 210 and 211 of relatively small and large transverse area extending slidably through end plates closing opposite ends of the cylinder. Suitable passages 212 and 213 open to opposite ends of the cylinder for supplying fluid under pressure. The passage 213, which opens to the small face of the piston 209, is connected to supply fluid under pressure constantly. The other passage 212 is adapted to be connected either to supply fluid under pressure at a metered rate so as to cause movement of the piston 209 to the right against the opposed pressure acting on the smaller advancing face, or to exhaust fluid so as to effect movement of the piston in the opposite direction.

The piston 209 is operatively connected through a power multiplying member to the adjusting screw 199. In the present instance, this member comprises a lever 214 pivoted at 215, and having a short bifurcated arm 216 adapted for bearing engagement with the shoulder abutment 204, and a long depending arm 217 having a bifurcated end in bearing engagement with a shoulder 218 on the forward end of the piston rod 210.

An adjustable stop is provided for limiting the forward movement of the piston 209 to determine the point at which the infeed is instituted. In the present instance, this stop comprises a bolt 219 threaded into a nut 220 slidably secured by a spline screw 221 in a bore 222 opening through the front wall of the machine base 1. An adjusting screw 223 is rotatably anchored in a block 224 on the front of the base, and is in threaded engagement with the forward end of the nut 220. The outer end of the screw 223 is provided with a micrometer dial 225, and is squared for the reception of a hand tool. It will be evident that upon adjusting the axial position of the bolt 219, which is disposed in position for end engagement by the piston rod 210, the extent to which the piston may be moved forwardly may be varied, thereby limiting the extent of oscillation of the lever 214 as well as the extent of retract movement of the abutment shoulder 203 away from the front limit stop 183.

Hydraulic control mechanism

The rate of infeed and dwell is controlled hydraulically by a control system including the slide actuator 171, 172 and the resistance actuator 208, 209. Referring to Fig. 16, the system may comprise any suitable source of fluid under pressure. In the present instance, fluid is supplied by a constant delivery pump 227 driven by a motor 227a and taking fluid from a reservoir 228, and discharging fluid through a pressure line 229 to a control valve 230. A working pressure relief valve 231 serves to maintain a constant pressure in the line 229.

The valve 230 comprises a suitable housing 233 having a bore 234 with suitable port connections to the cylinder lines 175, 176, 212 and 213, the pressure line 229, an exhaust line 235 for returning fluid to the reservoir 228, and a bypass line 236 connected to the line 212. A suitable valve plunger 237 extends through and is reciprocable in the bore 234 and is operable by electric solenoids A and B connected to opposite ends. Normally, the valve plunger 237 is urged into central or neutral position by the pressure of a spring 238.

The valve has three positions of operation, namely, an intermediate or neutral position, as shown in Fig. 18, when both solenoids A and B are deenergized, a right end position when the solenoid A is energized, and the solenoid B is deenergized, and a left end position when the solenoid B is energized and the solenoid A is deenergized. The details of construction of the valve 230 per se form no part of the present invention and, therefore, are not fully described.

It is sufficient to state that in the right end "grind" position, the valve acts to supply fluid under pressure to both lines 175 and 176, thereby instituting a forward grinding stroke, and to supply fluid through the line 212 to the forward end of the cylinder 208 to control the rate of infeed. In this position of the valve, the bypass line 236 is closed. In the intermediate "retract" position of the valve 230, fluid is supplied to the line 175, and exhausted from the lines 176 and 236, the line 212 being blocked, so that the wheel slide 16 will be retracted through a predetermined distance sufficient to clear the wheel from the work to permit indexing. In the left-hand "stop" position, the lines 175, 176 and 212 will be blocked, and the line 236 will be connected to exhaust so as to stop the slide 16 in remote position. The port connections for different positions of the valve are outlined in Fig. 19.

Interposed in the line 212 is an adjustable restricted orifice 239 for metering the supply of fluid under pressure to the forward end of the cylinder 208. The orifice 239 may be of any suitable type, and in the present instance comprises a rotary valve member 240 in a valve bore 241, and formed with a tapered peripheral metering groove 242 adjustable across one of the port terminals of the line 212 to define the orifice area. The groove 242 is connected through a suitable passage 243 to the other port terminal of the line 212. The valve member 240 is connected to an adjusting shaft 244 having an operating knob 245 at the front of the machine.

The force required to control the advance of the wheel slide 16 is comparatively small and the differential pressure areas of the piston are relatively large. Consequently, the orifice 239 can have a relatively large flow area and will experience a comparatively small drop or differential across the orifice restriction. The line 236 is adapted to bypass the orifice 239, and is blocked at the valve 230 when the orifice is to be effective. During the infeed, the hydraulic actuator 208, 209 overcomes the actuator 171, 172, and the rate of movement is controlled by metering fluid through the orifice 239 into the forward end of the cylinder 208. Thus, the piston 209 is caused to move to the right at a graduated rate determining the feed rate, and the actuator 171, 172 serves merely to cause the slide 16 to follow up the intermediate stop 182. The feed control continues until the forward movement of the intermediate stop 182 and the slide 16 is arrested by the positive front stop 183.

Figure 14:
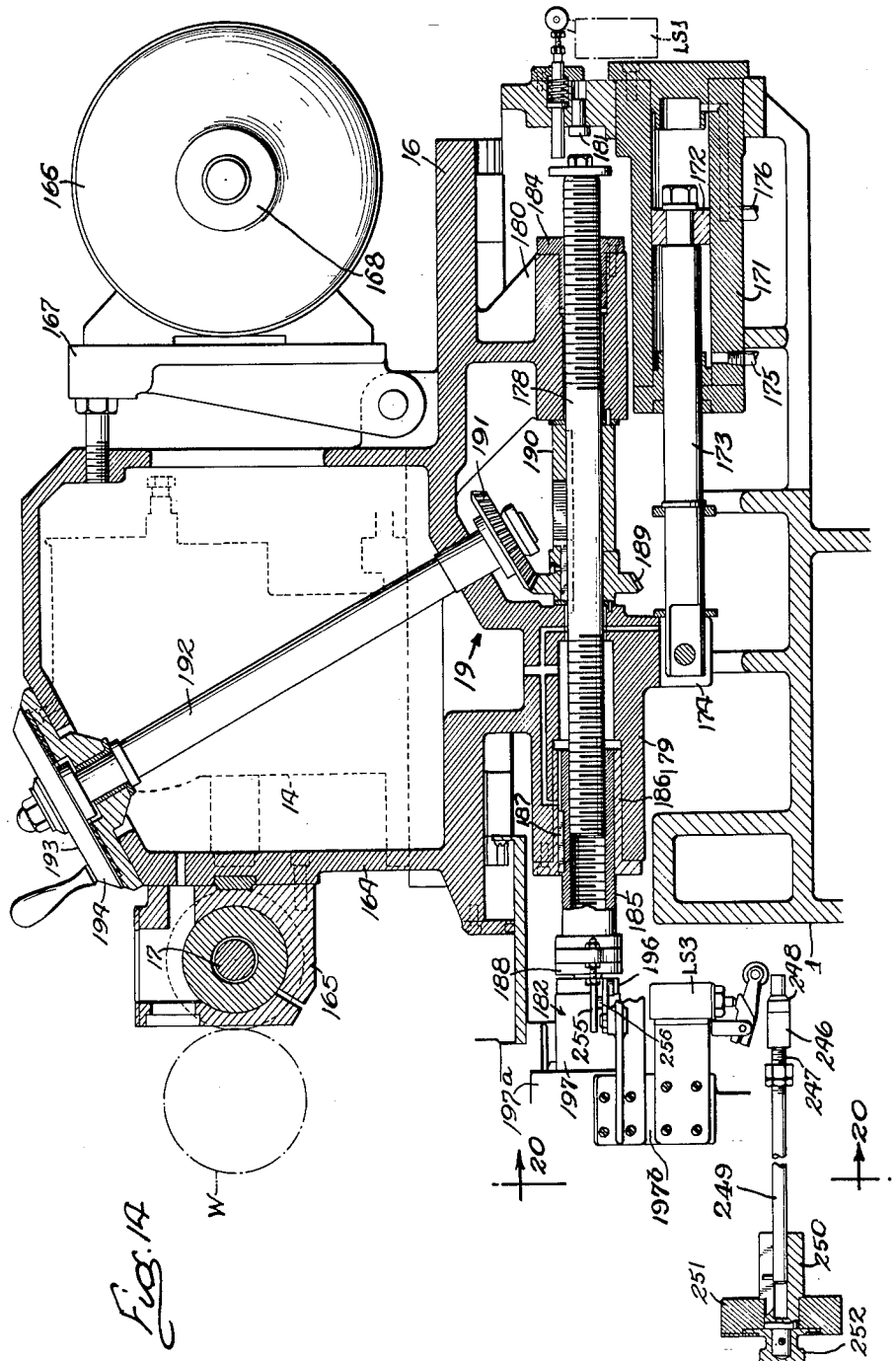
Fig. 14 is a fragmentary transverse vertical sectional view illustrating the rear portion of the cross feed mechanism of the machine.
Figure 15:
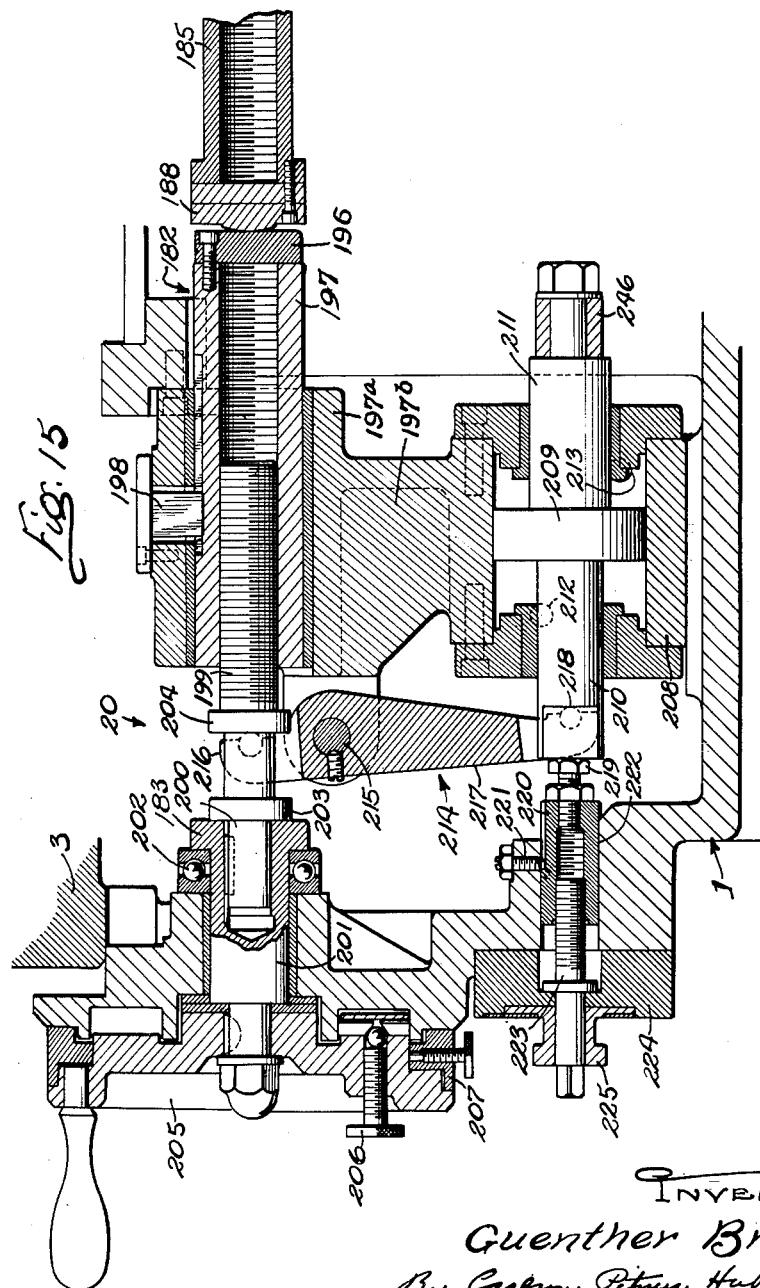
Fig. 15 is a fragmentary transverse vertical sectional view illustrating the forward portion of the cross feed mechanism.

At the end of the infeed movement, the resistance actuator 208, 209 becomes the motivating actuator for effecting a grinding dwell until the wheel G sparks out. Thus, the piston 209 continues to move to the right at a rate determined by the orifice 239, this movement being permitted by separation of the upper arm 216 on the lever 214 from the shoulder abutment 204. The movement continues until a limit switch LS3 is actuated to effect adjustment of the valve 230 into position to retract the grinding wheel G from the work. More particularly, the rear piston rod 211 carries an arm 246 through which an adjusting screw 247 is threaded. A cam 248 on the end of the screw 247 is adapted for engagement with the switch LS3 to actuate the latter after a predetermined travel. When a maximum dwell is desired, the screw 247 is adjusted, for example as shown in Fig. 14, to locate the cam 248 against the arm 246, and hence at a substantial distance from the actuator for the switch LS3. The period or duration of the dwell is determined by the initial spacing between the cam 248 and the switch LS3 and the rate of continued movement of the hydraulic actuator 208, 209 after engagement of the abutment 203 with the stop 183. This determines the time required for the cam 248 to move into operating engagement with the switch LS3. The dwell is progressively shortened as the screw 247 is adjusted to separate the cam 248 axially from the arm 246. Thus, if the cam 248 is adjusted for immediate engagement with the switch LS3, no dwell will obtain.

The screw 247 has a shaft extension 249 slidably splined for relative axial movement in an adjusting shaft 250 journaled in a block 251 on the front wall of the base 1, and provided with a hand knob 252.

Upon actuation of the switch LS3 (see Figs. 16, 20 and 21), the valve 230 is shifted into retract position to effect rearward movement of the wheel slide 16. The retract movement is limited by a switch LS2 operable when the plate 188 separates from the intermediate plate 196. The switch LS2 is operable by a rod 253 extending forwardly through the base 1 and guided at the forward end in a bracket 254. A spring 253a tends to urge the rod 253 forwardly to maintain the switch LS2 in one condition of adjustment. The forward end of the rod 253 bears against the rounded end of one arm of a switch lever 255 having a fulcrum 256. The other arm of the lever 255 bears against an adjustable stop bolt 257 fixed on the nut member 185 adjacent the plate 188. The fulcrum 256 is carried by a second lever 258 secured at one end through a slot-and-pin connection 258a to the bracket 254, and pivoted at the other end to the intermediate stop plate 196. In operation, as long as the intermediate abutment member 178 and the stop member 182 remain in engagement for joint rearward movement, the fulcrum 256 will shift about the pin 258a, and the levers 255 and 258 will not experience relative movement. However, when the intermediate abutment member 178 reaches the limit of the retract movement and starts to separate from the stop 182, the lever 258 will remain stationary, and the lever 255 will swing about the fulcrum 256 to actuate the switch LS2, thereupon effecting a return adjustment of the valve 230 into "grind" position to institute another infeed stroke.

After indexing movement of the work support 4 (see Fig. 5) through a predetermined number of steps for grinding all of the thread grooves, a dog 259 adjustably secured on a dog bar 260 carried by the support engages a limit switch LSTA on the base 1 to cause the final retract movement of the slide 16 to continue without interruption into the remote stop position. A full return movement of the slide 16 may be effected at any time, as for example for the purpose of dressing the wheel G by actuating a stop cycle switch S8.

Each time the slide 16 moves into remote position, a limit switch LS1 is closed to control the work spindle motor 48 and stop the spindle 6 for unloading and reloading at the end of the grinding operation.

ELECTRIC CONTROL CIRCUITS AND OPERATION

Current is adapted to be supplied for all of the various motors of the machine, including the work spindle motor 48, the indexing motor 97, the wheel motor 166, the dresser motor 195, and the hydraulic pump motor 227a, as well as a coolant pump motor 265, from three main supply lines $L_1$, $L_2$ and $L_3$ adapted to be connected to a suitable source of three-phase alternating current. Suitable lower voltage current for the control circuit proper is derived from a step-down transformer 266 having a primary winding connected across the lines $L_1$ and $L_3$, and a secondary winding with lines $L_4$ and $L_5$ connected to opposite terminals, the line $L_5$ being adapted for connection to a line $L_6$.

The control circuits include the limit switches LS1 to LS5 and LSTA, and dresser operated limit switches LSDF and LSDR, the solenoids A, B and C, and manual selector switches S1 to S4 and S7 to S9. The switch S5 is selectively adjustable to disable the dressing mechanism 14 or to condition it for operation through a single cycle or continuously through repeating cycles. The switch S6 is selectively adjustable to condition the machine either for hand operation or automatic operation. The selector and push button switches are mounted on a panel 267 on the front of the base 1.

To condition the machine for operation, the switches S5 and S6 are usitably adjusted, and the switch S1 is closed to energize relay HYD. This closes holding contacts $HYD^1$ across the switch S1 to connect the lines $L_6$ and $L_6$, and closes motor contacts $HYD^2$ to complete the circuit connections for the motors 166, 227a and 265 which operate continuously. The switch S2 is a master stop which may be opened at any time to effect deenergization of the relay HYD and thereby stop the entire machine.

To initiate machine operation, the start cycle switch S7 is closed momentarily to energize relay CR1, whose contacts $CT1^1$ close to establish a holding circuit, and contacts $CR1^2$ close to energize valve solenoid A. The switch S8 in the circuit for the relay CR1 may be opened at any time to stop the cycle.

Excitation of the solenoid A serves to shift the valve 230 into "grind" position, and thereupon the cross slide 16 starts to move forwardly out of remote position in a rapid advance. As soon as the slide 16 leaves the remote position, the limit switch LS1 closes to energize relay WH, thereby closing contacts $WH^1$ to start the work spindle motor 48.

At the end of the rapid approach, determined by engagement of the abutment plates 188 and 196, the limit switch LS2 is operated, and acts to condition the circuit for relay CR2, and to disable the indexing mechanism 11. The wheel slide 16 now continues to advance in an infeed movement at a controlled rate. The infeed movement continues to grinding depth or size, determined by engagement of the shoulder abutment 203 with the forward positive stop 183, and at the end of the infeed, the control actuator 208, 209 continues to move independently of the slide 16 through a predetermined adjustable distance, defining a dwell period, until it actuates the limit switch LS3.

Actuation of the limit switch LS3 closes the circuit for relay CR2, whereupon contacts $CR2^1$ open the circuit for the solenoid A, contacts $CR2^2$ energize relay CR3, contacts $CR2^3$ establish a holding circuit across the switch LS3, and contacts $CR2^4$ open the circuit for the pin solenoid C. Relay CR3 opens the circuit for the solenoid A also at contacts $CR3^1$, closes contacts $CR3^2$ without effect, closes contacts $CR3^3$ to condition indexing circuit, closes a holding circuit through contacts $CR3^4$ across contacts $CR2^2$, and closes contacts $CR3^5$ to prepare the circuit for the solenoid C. As a result of deenergization of the solenoid A, the valve 230 is shifted into retract position so that the slide 16 is retracted a short distance to clear the wheel G from the work.

The retract movement is terminated upon separation of the abutment plates 188 and 196 which actuate limit switch LS2 to interrupt the circuit for the relay CR2 and prepare the circuit for the indexing mechanism. It will be understood that at the start of the retract movement the limit switch LS3 is again actuated, but without effect. Upon deenergization of the relay CR2, the contacts CR2⁴ close to complete the circuit for the solenoid C which retracts the pin or plunger 125 from the index disk 121.

The plunger 125 actuates the limit switch LS4, thus locking out the solenoid A, and completing the circuit for the solenoid B and the forward indexing relay FW. Thereupon, the valve 230 is shifted into "stop" position to lock the slide 16 against movement, and the contacts FW¹ are closed to connect the index motor 97 for forward rotation to index the work spindle 6 axially through one step corresponding to the tooth pitch of the work.

As the disk 121 nears one complete revolution, the cam 123 actuates the limit switch LS5, thereby deenergizing the relay CR3 to drop out contacts CR3³ and CR3⁵, and thereby open the circuits for the solenoids B and C and the relay FW. As a result, the plunger 125 is released for engagement against the periphery of the disk 121 and the circuit for the motor 97 is opened. The motor 97 continues to coast, and carries the high point of the cam 123 past the limit switch LS5 to close the latter. When the disk 121 completes one revolution, the plunger 125 engages in the notch 122 and actuates the limit switch LS4 to reestablish the circuit for the solenoid A and thereby effect shifting of the valve 230 into "grind" position for the next wheel infeed movement.

The foregoing cycle of infeed and retract movements, with an intermediate indexing movement is repeated for each tooth groove, and during each infeed movement, in the case of relief grinding, the work support 4 is oscillated once for each tooth.

During the indexing movement following the grinding of the last tooth groove, the dog 259, movable with the work support 4, actuates the limit switch LSTA to energize the relay CR4. As a result, the relay CR1 is deenergized, dropping out contacts CR1² to prevent return of the valve 230 into "grind" position. The relay CR4 closes holding contacts CR4³ across the contacts CR3², closes contacts CR4⁴ to maintain the circuit for the solenoid C thus maintaining the limit switch LS4 in position, opens contacts CR4¹ to disable the relay FW and deenergize the solenoid B, and closes contacts CR4² to establish a circuit for relay REV. Upon deenergization of the solenoid B, the valve 230 is shifted back into retract position to cause the wheel slide 16 to return at a rapid traverse rate into the remote or dressing position. The relay REV closes contacts REV¹ to complete a circuit for operating the index motor 97 in a reverse direction, and the motor continues to operate reversely to return the work support 4 in a free return stroke to initial or starting position. During this return movement, the cam 123 is ineffective to open the limit switch LS5, but rides over the latter once for each revolution of the disk 121, and the work support 4 is allowed a slight amount of overtravel at the end of which a dog 261 on the bar 260 actuates the limit switch LSTA to deenergize the relay CR4. When this occurs, the circuits for the relays REV and FW are reversed, and the work support 4 is indexed to the right into starting position to take up backlash. The final indexing, with the slide 16 in remote position, is completed by opening of the circuit switches LS5 and LS4, and since the contacts CR1² are now open, the machine will stop until the start cycle switch S7 is again closed. It will be understood that the machine cycle may be interrupted at any time by opening the switch S8 to deenergize the relay CR1.

Dressing of the wheel G may be effected, when the wheel slide 16 is in remote position, by closing the switch S4. This energizes relay DF, opening contacts DF¹, closing holding contacts DF², and closing contacts DF³ to operate the dresser motor 195 in a forward direction. At the end of the dressing movement in one direction, limit switch LSDF is opened and limit switch LSDR is closed to energize relay DR. The latter opens contacts DR¹, and closes contacts DR² to operate the motor 195 in a reverse direction. At the end of the cycle, the limit switch LSDR is opened to stop the operations. Upon movement of the switch S5 in "continuous" position, it will close a shunt circuit across the contacts DR¹ and the dressing cycle will be continuously repeated.

I claim as my invention:

1. In a machine tool, in combination with a base and a machine element slidably mounted on said base, spaced positive stops for limiting respectively the forward and rear limit positions of said element, an elongated intermediate stop member slidably disposed for engagement at one end with the forward limit stop, an intermediate abutment member mounted on said element and arranged for engagement at opposite ends respectively with said rear limit stop and the other end of said intermediate stop member, said intermediate stop member comprising a non-rotatable sleeve nut having an abutment plate at one end and an adjusting screw threaded into the other end of said nut and having an abutment shoulder at said other end for engagement with said forward limit stop, means extending through said forward limit stop in driving engagement with said screw for adjusting the latter, whereby to vary the overall length of said intermediate stop member to vary the permissable range of movement of said element.

2. In a machine tool, in combination with a base and a machine element reciprocable on said base, an intermediate abutment member comprising a screw threaded in said element for longitudinal movement therewith, a positive stop in said base disposed for end engagement by the rear end of said screw to limit the rearward position of said element, a sleeve non-rotatably slidable in said element and in threaded engagement with the forward end of said screw and having an abutment on the outer forward end, the threaded engagement of said screw with said sleeve having double the lead of said screw with said element, means for rotating said screw to shift the position of said element relative to said stop, a forward positive stop in said base, an intermediate stop member slidably disposed in said base between said abutment and said forward stop for respective engagement therewith at opposite ends, yieldable power means for reciprocating said element, and means for reciprocating said intermediate stop member in opposition to said yieldable means.

3. In a machine tool, in combination with a base and a machine element reciprocable on said base, spaced opposed positive stops for limiting the movement of said element in opposite directions, an intermediate stop member interposed between and in alignment with said positive stops, said intermediate elongated stop member being adjustable in overall length and being longitudinally movable into and out of engagement at one extreme end with the forward positive stop, an intermediate elongated abutment member adjustably mounted in said element and disposed between and in longitudinal alignment with said intermediate stop member and the rear positive stop for engagement of opposite ends respectively therewith upon movement in opposite directions, a hydraulic actuator connected to said element for moving said element at a rapid traverse rate into and out of engagement with said intermediate stop member and for maintaining said intermediate abutment member in engagement with said intermediate stop member for continued movement therewith in one direction, and a hydraulic actuator of greater power than said first mentioned actuator coacting with said intermediate stop member to resist and control movement thereof by said first mentioned actuator in said one direction.

4. In a machine tool, in combination, a first slidable member having a limited extent of movement, a second slidable member having a larger extent of movement and adapted for abutting engagement with said first member for movement therewith, means including a limit switch for controlling the extent of movement of said second member in one direction, a lever pivoted at one end to said first member and having a stationary fulcrum at the other end, and a second lever having a movable fulcrum intermediate its ends on said first lever and pivotally associated at opposite ends with said second member and said switch, whereby upon joint movement of said members in said one direction, said movable fulcrum will be oscillated about said stationary fulcrum, an upon separation of said members at the limit of movement of said first member in said one direction, said movable fulcrum will remain stationary to effect oscillation of said second lever to actuate said switch.

5. In a machine tool, in combination, a first slidable member having a limited extent of movement, a second slidable member having a larger extent of movement and adapted for abutting engagement with said first member for movement therewith, a movable hydraulic actuator for reciprocating said first member, a source of fluid under pressure, a valve selectively adjustable to connect said source to opposite sides of said actuator, and valve control means including a limit switch operable in response to movement of said members into interengagement for joint movement in one direction to adjust said valve into position to control said joint movement, and operable in response to separation of said members after movement of said first member in the opposite direction into one limit position to adjust said valve into position to stop said actuator.

6. In a machine tool, in combination, a first slidable member having a limited extent of movement, a second slidable member having a larger extent of movement and adapted for abutting engagement with said first member for movement therewith, a movable hydraulic actuator for reciprocating said first member, a source of fluid under pressure, a valve selectively adjustable to connect said source to opposite sides of said actuator, and valve control means including a limit switch operable in response to movement of said members into interengagement for joint movement in one direction to adjust said valve into position to control said joint movement, and a second switch operable upon movement of said members in said one direction into one limit position to adjust said valve into position to effect reverse movement of said first member, said first limit switch being operable in response to separation of said members after movement of said first member in said opposite direction into the other limit position to adjust said valve into position to stop said actuator.

7. In a machine tool, in combination, a base, a machine element slidable on said base, yieldable power means for reciprocating said element, a stop member having a limited range of movement and being supported in the path of said element for separable engagement thereby upon movement of said element in one direction, stop means for limiting the extent of movement of said element with said member in said one direction, a hydraulic actuator of greater power than said power means, a separable power-multiplying connection between said actuator and said stop member, first and second supply passages opening respectively to opposite sides of said actuator, an adjustable restricted orifice interposed in said first passage, a relatively unrestricted passage adapted to be connected across said orifice, a source of fluid under pressure, and valve means operable in one position to direct fluid from said source through said first passage and said orifice at a metered rate to said actuator whereby to oscillate said lever in a retreating direction to permit movement of said stop member with said element under the influence of said power means at a controlled rate until interrupted by said stop means, and operable in another position to direct fluid through said second passage to said actuator and from the discharging side of said actuator through said bypass passage to effect movement of said stop member in the reverse direction.

8. In a machine tool, in combination, a base, a machine element slidable on said base, yieldable power means for reciprocating said element, a stop member having a limited range of movement and being supported in the path of said element for separable engagement thereby upon movement of said element in one direction, stop means for limiting the extent of movement of said element with said member in said one direction, a hydraulic actuator operatively connected to said stop member, first and second supply passages opening respectively to opposite sides of said actuator, an adjustable restricted orifice interposed in said first passage, a source of fluid under pressure, and valve means operable in different positions to direct fluid from said source selectively through one or the other of said passages to said actuator to effect movement of said stop member with said element in said one direction under the influence of said power means at a controlled rate until interrupted by said stop means, or to effect movement thereof in the opposite direction.

9. In a machine tool, in combination, a base, a machine element slidable on said base, a first hydraulic actuator for reciprocating said element, a stop member having a limited range of movement and being supported in the path of said element for separable engagement thereby upon movement of said element in one direction, stop means for limiting the extent of movement of said element with said member in said one direction, a lever pivotally supported intermediate its ends and having a relatively short arm disposed in the path of said stop member for separable engagement thereby upon movement thereof in said one direction and having a relatively long arm, a second hydraulic actuator of greater power than said first actuator and operatively connected to said long arm, first and second supply passages opening respectively to opposite sides of said actuator, an adjustable restricted orifice interposed in said first passage, a relatively unrestricted passage adapted to be connected across said orifice, a source of fluid under pressure, and valve means operable in one position to direct fluid from said source through said first passage and said orifice at a metered rate to said actuator whereby to oscillate said lever in a retreating direction to permit movement of said stop member with said element under the influence of said first hydraulic actuator but at a controlled rate until interrupted by said stop means, and operable in another position to direct fluid through said second passage to said actuator and from the discharging side of said actuator through said bypass passage to effect movement of said stop member in the reverse direction.

10. In a machine tool, in combination, a base, a machine element slidable on said base, yieldable power means for reciprocating said element, a stop member having a limited range of movement and being supported in the path of said element for separable engagement thereby upon movement of said element in one direction, stop means for limiting the extent of movement of said element with said member in said one direction, a hydraulic actuator having a separable connection with said stop member and adapted for retreating movement to effect movement of said stop member in said one direction, and for advancing movement to effect movement of said stop member in the reverse direction, and control means for said actuator, said control means comprising valve means for directing fluid under pressure selectively to opposite sides of said actuator, and valve actuating means including a switch operable to adjust said valve means into position to effect movement of said stop member in reverse direction, said actuator being operable upon engagement of said stop means by said stop member to continue in said retreating movement and after a predetermined extent of movement to actuate said switch, whereby to reverse said stop member after a dwell.

11. In a machine tool, in combination, a base, a machine element slidable on said base, yieldable power means for reciprocating said element, a stop member having a limited range of movement and being supported in the path of said element for separable engagement thereby upon movement of said element in one direction, stop means for limiting the extent of movement of said element with said member in said one direction, a hydraulic actuator having a separable connection with said stop member and adapted for retreating movement to effect movement of said stop member in said one direction, and for advancing movement to effect movement of said stop member in the reverse direction, and control means for said actuator, said control means comprising valve means for directing fluid under pressure selectively to opposite sides of said actuator and for stopping said actuator, and valve actuating means including a switch operable to adjust said valve means into position to effect movement of said stop member in reverse direction, said actuator being operable upon engagement of said stop means by said stop member to continue in said retreating movement and after a predetermined extent of movement to actuate said switch, whereby to reverse said stop member after a dwell, said valve actuating means further including a second swich operable upon reverse movement of said stop member into a limit position to adjust said valve means into position to stop said actuator.

12. In a machine tool, in combination, a base, a machine element slidable on said base, yieldable power means for reciprocating said element, a stop member having a limited range of movement and being supported in the path of said element for separable engagement thereby upon movement of said element in one direction, stop means for limiting the extent of movement of said element with said member in said one direction, a hydraulic actuator having a separable connection with said stop member and adapted for retreating movement to effect movement of said stop member in said one direction, and for advancing movement to effect movement of said stop member in the reverse direction, control means for said actuator, said control means comprising valve means for directing fluid under pressure selectively to opposite sides of said actuator and for stopping said actuator, and valve actuating means including a switch operable to adjust said valve means into position to effect movement of said stop member in reverse direction, said actuator being operable upon engagement of said stop means by said stop member to continue in said retreating movement and after a predetermined extent of movement to actuate said switch, whereby to reverse said stop member after a dwell, said valve actuating means further including a second switch operable upon reverse movement of said stop member into a limit position to adjust said valve means into position to stop said actuator, means for adjustably limiting the extent of advancing movement of said actuator, and means for adjusting the extent of retreating movement of said actuator required to actuate said first mentioned switch.

13. In a relieving machine, in combination, an axially reciprocatory spindle, means for reciprocating said spindle in opposite directions, a gear having an elongated axial hub supported on said spindle for relative rotary adjustment and constrained against axial movement, a plate pivotally adjustable on said hub and formed with a guide groove, a drive pin connected to said spindle and extending radially therefrom into sliding engagement with said groove, said groove when disposed parallel to the spindle axis constraining said spindle and gear for joint rotation and when disposed at an angle to said axis acting to change the angular phase relation of said spindle to said gear in timed relation to the axial movement of said spindle, and means for driving said gear.

14. In a grinding machine, in combination, a base, a machine element slidable on said base, a rotary spindle supported on said element, power means operable to index said element step-by-step axially of said spindle, including an adjusting screw journaled in said base and an elongated sleeve nut mounted in said element for movement therewith, the exterior of said nut constituting a first gear with elongated gear teeth, and a second gear journaled in said base and meshing with said first mentioned gear in all positions of movement of said element, said second gear normally acting to constrain said nut against rotation and being operable to locate said nut, whereby to shift said element independently of rotation of said screw.

15. A relief grinding machine comprising, in combination, a base, a work slide carrying a work spindle and being shiftable on said base axially of said spindle, a tool slide carrying a tool spindle and being shiftable on said base transversely of said work spindle, a cross feed mechanism for automatically shifting said tool slide in a cycle comprising a rapid approach from a remote position and a controlled infeed in a forward direction to a positive stop, then a succession of alternate partial retract and infeed movements, and finally a return movement to said remote position, an indexing mechanism for automatically shifting said work slide in a step-by-step movement in one direction, one indexing step following each retract movement of said tool slide, and returning said work slide in a continuous free return stroke in the opposite direction to initial position upon return of said tool slide to remote position, means for driving said work spindle, and means for oscillating said work slide about an axis parallel to said work spindle in timed relation to the rotation of said work spindle.

16. A relief grinding machine comprising, in combination, a base, a work slide carrying a work spindle and being shiftable on said base axially of said spindle, a tool slide carrying a tool spindle and being shiftable on said base transversely of said work spindle, a cross feed mechanism for automatically shifting said tool slide in a cycle comprising a rapid approach from a remote position and a controlled infeed in a forward direction to a positive stop, then a succession of alternate partial retract and infeed movements, means for automatically effecting a dwell at the end of each infeed movement, and finally a return movement to said remote position, an indexing mechanism for automatically shifting said work slide in a step-by-step movement in one direction, one indexing step following each retract movement of said tool slide, and returning said work slide in a continuous free return stroke in the opposite direction to initial position upon return of said tool slide to remote position, means for automatically instituting each indexing step at the end of the preceding partial retract movement, means for automatically instituting each infeed movement following the initial partial retract movement at the end of the preceding indexing step, means for automatically instituting the free return movement at the end of the return of said tool slide to remote position, means for driving said work spindle, and means for oscillating said work slide about an axis parallel to said work spindle in timed relation to the rotation of said work spindle.

17. A relief grinding machine comprising, in combination, a base, a work slide carrying a work spindle and being shiftable on said base axially of said spindle, a tool slide carrying a tool spindle and being shiftable on said base transversely of said work spindle, a cross feed mechanism for automatically shifting said tool slide in a cycle comprising a rapid approach from a remote position and a controlled infeed in a forward direction to a positive stop, then a succession of alternate partial retract and infeed movements, and finally a return movement to said remote position, an indexing mechanism for automatically shifting said work slide in a step-by-step movement in one direction, one indexing step following each retract movement of said tool slide, and returning said work slide in a continuous free return stroke in the opposite direction to initial position upon return of said tool slide to remote position, means for driving said work spindle, means for oscillating said work slide about an axis parallel to said work spindle in timed relation to the rotation of said work spindle, and control means for said first mentioned means automatically operable to start said work spindle upon movement of said tool slide out of remote position and to stop said work spindle upon return of said tool slide to remote position.

18. A grinding machine comprising, in combination, a base, a work slide carrying a work spindle and being shiftable on said base axially of said spindle, a tool slide carrying a tool spindle and being shiftable on said base transversely of said work spindle, a cross feed mechanism for automatically shifting said tool slide in a cycle comprising a rapid approach from a remote position and a controlled infeed in a forward direction to a positive stop, then a succession of alternate partial retract and infeed movements, and finally a return movement to said remote position, an indexing mechanism for automatically shifting said work slide in a step-by-step movement in one direction, one indexing step following each retract movement of said tool slide, and upon return of said tool slide to remote position returning said work slide in a continuous free return stroke in the opposite direction past initial position and indexing said work slide in said one direction back to initial position, and means for driving said work spindle.

19. In a machine tool, in combination, a base, a machine element slidable on said base, yieldable power means for reciprocating said element, an abutment member adjustably supported on said element independently of said power means and movable therewith, a mechanical stop member aligned with and movably interposed in the path of said abutment member for engagement at one end by the forward end of said abutment member upon movement of said abutment member in a forward direction, means including a hydraulic resistance unit parallel to said stop member and adapted to act against said stop member to resist movement thereof with said abutment member in said forward direction in opposition to said power means to control the rate of said last mentioned movement, and a positive stop interposed forwardly in the path of said stop member for engagement by the other end of said stop member to limit the extent of said joint movement, said stop member thus being movably interposed endwise between said abutment member and positive stop and being adjustable in overall length to vary the limit position of said element with reference to said positive stop.

20. In a machine tool, in combination, a base, a machine element slidable on said base, yieldable power means for effecting reciprocation of said element, spaced positive aligned stops located in opposed relation in said base, an intermediate elongated stop member interposed endwise between and longitudinally movable in said base between said stops and in the same direction as said element, and arranged for a limited range of movement into and out of engagement with one of said stops, said element having an elongated abutment member longitudinally aligned with said stop member and movable endwise separately between said other stop and said stop member beyond said limited range and jointly with said stop member through said limited range, and means for controlling the rate of movement of said stop member toward said first mentioned stop.

21. In a machine tool, in combination, a base, a machine element slidable on said base, a reversible hydraulic actuator for effecting reciprocation of said element at a rapid traverse rate, a stop member having a limited range of movement less than that of said element and disposed in the path of said element for engagement thereby and movement therewith in one direction, stop means for limiting the extent of movement of said element with said member in said one direction, a reversible hydraulic actuator for effecting reciprocation of said member at a controlled rate and having a greater power than said first mentioned actuator, a separable connection between said last mentioned actuator and said member permitting overtravel of said last mentioned actuator at the end of said movement of said element in said one direction, valve means for controlling said actuators to obtain an approach movement of said element into engagement with said member and then a joint movement of said element and said member at a controlled rate, and control means operable in response to said overtravel of said last mentioned actuator to effect reversal of said valve means.

22. In a machine tool, in combination, a base, a machine element slidable on said base through a predetermined range of movement, yieldable reversible power means for effecting reciprocation of said element, a stop member having a limited range of movement in said base less than that of said element and being interposed in the path of said element for separable engagement thereby upon movement in one direction, stop means for limiting the extent of movement of said element with said member in said one direction, stop means for limiting the movement of said member in the other direction while permitting continued movement of said element away from said member, and a reversible hydraulic actuator of greater power than said power means for effecting reciprocation of said member at a controlled rate in said one direction and in opposition to said power means in both directions when said element and said member are in engagement for joint movement.

23. In a machine tool, in combination, a first reciprocable member having a limited extent of movement, a second reciprocable member having a larger extent of movement than said first member and adapted for movement in one direction into abutting engagement with said first member for continued movement therewith and for movement in the opposite direction initially with said first member and then out of abutting engagement therewith to effect separation of said members, reversible drive means for reciprocating said first member, means for reversing the direction of operation of said drive means, and control means for said last mentioned means including a switch operable by separation of said members after movement of said first member with said second member in said opposite direction into one limit position of said first member to effect reversal of said drive means.

GUENTHER BRINKMANN.

REFERENCES CITED

The following references are of record in the file of this patent:

UNITED STATES PATENTS

| Number | Name | Date |
|---|---|---|
| 1,640,994 | Hanson | Aug. 30, 1927 |
| 1,920,979 | Fraser | Aug. 8, 1933 |
| 1,945,453 | Steiner | Jan. 30, 1934 |
| 2,101,383 | Asbridge | Dec. 7, 1937 |
| 2,141,853 | Brown | Dec. 27, 1938 |
| 2,151,660 | Goehring | Mar. 21, 1939 |
| 2,151,669 | Wood et al. | Mar. 21, 1939 |
| 2,183,490 | Flygare | Dec. 12, 1939 |
| 2,187,227 | Flanders | Jan. 16, 1940 |
| 2,243,405 | Wine | May 27, 1941 |